(12) United States Patent
Cha et al.

(10) Patent No.: US 7,670,414 B2
(45) Date of Patent: Mar. 2, 2010

(54) FILTER UNIT OF AIR CONDITIONER

(75) Inventors: Sang Won Cha, Changwon-si (KR); Hyun Hur, Busan-si (KR)

(73) Assignee: LG Electronics Inc., Seoul (KR)

( * ) Notice: Subject to any disclaimer, the term of this patent is extended or adjusted under 35 U.S.C. 154(b) by 901 days.

(21) Appl. No.: 11/079,202

(22) Filed: Mar. 15, 2005

(65) Prior Publication Data
US 2006/0032198 A1    Feb. 16, 2006

(30) Foreign Application Priority Data

Aug. 16, 2004 (KR) .................. 10-2004-0064427
Aug. 16, 2004 (KR) .................. 10-2004-0064428

(51) Int. Cl.
*B01D 46/00* (2006.01)

(52) U.S. Cl. .................. 96/398; 55/418; 55/467.1; 55/471; 55/472; 55/478; 55/480; 55/481; 96/417; 62/317; 62/427

(58) Field of Classification Search .................. 55/351, 55/471, 472, 473, 493, 385.2, 467.1, 487, 55/418, 478, 480, 481; 95/273; 96/416, 96/417, 424, 398; 165/80.3; 62/317, 382, 62/440, 78, 331, 314, 441, 427
See application file for complete search history.

(56) References Cited

U.S. PATENT DOCUMENTS

| 3,364,838 | A | * | 1/1968 | Bradley | ................ 312/213 |
| 4,385,911 | A | * | 5/1983 | Popeil et al. | ............... 96/131 |
| 5,217,513 | A | * | 6/1993 | Armbruster | ................ 96/414 |
| 5,595,153 | A | | 1/1997 | Hoppner et al. | |
| 5,733,348 | A | * | 3/1998 | Skarsten | ................ 55/385.2 |
| 5,772,738 | A | | 6/1998 | Muraoka | |
| 5,840,092 | A | * | 11/1998 | Rick et al. | ................ 55/472 |
| 5,893,939 | A | * | 4/1999 | Rakocy et al. | ................ 55/471 |
| 6,019,808 | A | * | 2/2000 | Ishikawa et al. | ................ 55/320 |
| 6,315,821 | B1 | * | 11/2001 | Pillion et al. | ................ 96/416 |
| 6,344,065 | B1 | * | 2/2002 | Boulva | ................ 55/471 |
| 6,358,139 | B1 | * | 3/2002 | Renz | ................ 454/187 |
| 6,554,880 | B1 | * | 4/2003 | Northcutt | ................ 55/385.2 |
| 6,926,762 | B2 | * | 8/2005 | Kim et al. | ................ 96/397 |
| 7,153,347 | B2 | * | 12/2006 | Kang et al. | ................ 96/422 |
| 7,258,715 | B2 | * | 8/2007 | Cox et al. | ................ 55/422 |
| 7,332,006 | B2 | * | 2/2008 | Kim et al. | ................ 55/385.2 |
| 7,350,371 | B2 | * | 4/2008 | Lee et al. | ................ 62/317 |

(Continued)

FOREIGN PATENT DOCUMENTS

CN    1235060 A    11/1999

(Continued)

*Primary Examiner*—Duane Smith
*Assistant Examiner*—Minh-Chau T Pham
(74) *Attorney, Agent, or Firm*—Birch, Stewart, Kolasch & Birch, LLP

(57) ABSTRACT

Disclosed is a filter unit for an air conditioner, which is provided at an indoor unit for the air conditioner so as to purify the air discharged to a room. The filter unit includes a filter for purifying air, a filter case accommodated in the filter and having a filter gate at a side thereof for placing/withdrawing the filter, and a cover for opening/closing the filter gate.

30 Claims, 22 Drawing Sheets

U.S. PATENT DOCUMENTS

| | | | |
|---|---|---|---|
| 7,465,327 B2 * | 12/2008 | Jang et al. | 55/385.1 |
| 2001/0029728 A1 * | 10/2001 | Massey et al. | 55/471 |
| 2001/0049927 A1 * | 12/2001 | Toepel | 55/385.2 |
| 2003/0150196 A1 * | 8/2003 | Duffy | 55/385.2 |
| 2004/0020363 A1 * | 2/2004 | LaFerriere et al. | 95/273 |
| 2005/0284114 A1 * | 12/2005 | Kim et al. | 55/471 |
| 2005/0284168 A1 * | 12/2005 | Lee et al. | 62/317 |
| 2006/0026936 A1 * | 2/2006 | Paumier et al. | 55/473 |
| 2006/0070358 A1 * | 4/2006 | Oda et al. | 55/295 |
| 2007/0113527 A1 * | 5/2007 | Song et al. | 55/471 |
| 2007/0144122 A1 * | 6/2007 | Ho | 55/471 |
| 2008/0000205 A1 * | 1/2008 | Bohlen | 55/471 |

FOREIGN PATENT DOCUMENTS

| | | | | |
|---|---|---|---|---|
| CN | 1326076 A | | 12/2001 | |
| EP | 1271065 | * | 3/2003 | 55/471 |
| EP | 1 495 708 A2 | | 1/2005 | |
| GB | 2360840 A | | 10/2001 | |
| JP | 63-93319 A | | 4/1988 | |
| JP | 2002-61877 | | 2/2002 | |
| JP | 2002364908 A | * | 12/2002 | 55/471 |
| JP | 2003207161 A | * | 7/2003 | 55/471 |

* cited by examiner

FILTER UNIT OF AIR CONDITIONER

CROSS-REFERENCE TO RELATED APPLICATIONS

This application claims the benefit of Korean Application No. P2004-64427, filed on Aug. 16, 2004 and Korean Application No. P2004-64428. filed on Aug. 16, 2004. which are hereby incorporated by reference as if fully set forth herein.

BACKGROUND OF THE INVENTION

1. Field of the Invention

The present invention relates to a separate type air conditioner, and more particularly, to a filter unit provided at an indoor unit for an air conditioner and purifying the air, the indoor unit which heats/cools a room.

2. Discussion of the Related Art

In general, an air conditioner is an apparatus for controlling temperature and humidity of air in a particular area according to a use. As an example of the air conditioner, there is an apparatus having a compressor and a heat exchanger and flowing a refrigerant so as to cool/heat an interior space such as a restaurant, a library, or an office. The air conditioner is divided into am integrated type air conditioner and a separate type air conditioner.

The integrated type air conditioner includes an indoor unit having a heat exchanger for cooling/heating the room, and an outdoor unit having a heat exchanger fir exchanging heat with the outside air and a compressor for compressing the refrigerant at a high temperature with a high pressure.

In this case, the indoor unit and the outdoor unit are separately provided at inside or outside of a room, respectively, and connected with each other via a refrigerant pipe.

Hereinafter, the indoor unit of the separate type air conditioner in accordance with a related art will be described with reference to the appended drawings.

FIG. 1 is a perspective view showing an indoor unit of a separate type air conditioner in accordance with a related art, and FIG. 2 is a cross sectional view showing the indoor unit of the separate type air conditioner in accordance with the related art.

Referring to FIGS. 1 and 2, the indoor unit of the separate type air conditioner in accordance with the related art includes a cabinet 10, a heat exchanger 20 provided in the cabinet 10, and a fan 30 provided at a lower part of the heat exchanger 20 for forcing airflow.

In this instance, a front air inlet (not shown) is provided on a front surface of the cabinet 10, an upper air inlet (not shown) is provided on an upper surface thereof, and an air outlet 11 is provided at a lower part thereof.

A front suction grill 12 and a top suction grill 13 are provided at the front air inlet and the top air inlet, respectively. In this case, the top suction grill 13 and the cabinet 10 are formed as a single body.

A front filter 14 is provided inside of the front suction grill 12 so as to purify the air drawn through the front air suction inlet.

Meanwhile, the cabinet 10 includes a louver 15 for controlling the air discharged to the outlet in a left/right direction, and a vein 16 for controlling the air discharged to the air outlet 11 in an up/down direction.

The indoor unit of the related art with the aforementioned structural elements draws in the air from outside of the cabinet 10 through the operation of the fan 30, i.e., from the room, and the air drawn into the indoor unit is cooled/heated at the heat exchanger 20 and then discharged back to the room so as to cool/heat the room.

In the indoor unit of the air conditioner in accordance with the related art, only the air drawn in through the front air inlet 12 is purified by the front filter 14, but the air drawn in through the top air inlet having the top suction grill provided thereat is discharged to the room without being purified, resulting in a problem that the air is insufficiently purified.

When a separate filter is provided in the cabinet 10 to purify the air drawn in through the top air inlet, there is a problem that it is difficult to replace the filter.

SUMMARY OF THE INVENTION

Accordingly, the present invention is directed to a filter unit for an air conditioner that substantially obviates one or more problems due to limitations and disadvantages of the related art.

An object of the present invention is to provide a filter unit for an air conditioner, which is provided at an indoor unit for an air conditioner and purifying the air discharged to a room.

Another object of the present invention is to provide a filter unit for an air conditioner, in which it is easy to place/withdraw a filter.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a filter unit comprises a filter for purifying air; a filter case accommodated in the filter and having a filter gate at a side thereof for placing/withdrawing the filter thereto/therefrom; and a cover for opening/closing the filter gate.

The cover is rotatably connected to a side of an edge of the filter gate. The cover comprises a first panel having a side rotatably connected to an edge of the filter gate; and a second panel having a side rotatably connected to the edge of the filter gate.

The first panel is rotatably connected to one of the both ends of the edge of the filter gate, and the second panel is rotatably connected to another one of the both ends of the edge of the filter gate.

The filter gate is provided at an upper part of the filter case. The cover comprises an air inlet for drawing in the air into the filter case. The cover further comprises a louver for opening/closing the air inlet. The louver guides the air drawn in through the air inlet. The filter case comprises a placement/withdrawal guide for guiding the filter.

The filter unit further comprises a filter drawer for withdrawing the filter. The filter drawer comprises an elastic means provided at one of the filter and the filter case and applying restoring force to the filter in a direction of withdrawing the filter; and a restoration controller for controlling the restoration of the elastic means.

The elastic means comprises a side connected to the filter case. The restoration controller comprises a fixing means for fixing the elastic means in a changed shape; and a releaser for releasing the elastic means fixed by the fixing means.

The fixing means comprises a hook member provided at the filter case and binding one of the filter and the elastic means. The hook member is rotatably provided at the filter case. The releaser comprises a withdrawal button provided at the filter case; and a link member having a first end connected to the withdrawal button and a second end connected to the fixing means.

The filter drawer comprises a movement converter for converting a rotation movement of a motor into a straight movement in a direction of placing/withdrawing the filter so as to withdraw the filter.

The movement converter comprises a pinion being rotated by the motor for withdrawing the filter; and a rack moving straight in the direction of withdrawing the filter by the pinion so as to withdraw the filter. The rack and the filter unit are formed as a single body.

The filter drawer comprises a filter handle provided at a side of the filter. The filter may be withdrawn outside of the filter case by one-touch system.

The filter unit further comprises a sensor for sensing a pollution level of the filter. The filter is automatically withdrawn from the filter case when the pollution level of the filter is over a predetermined level, the pollution level sensed by the sensor.

The filter unit displays information related to the pollution of the filter outside thereof. The filter case is detachably provided on an outer wall of the indoor unit of the air conditioner and communicating with the indoor unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
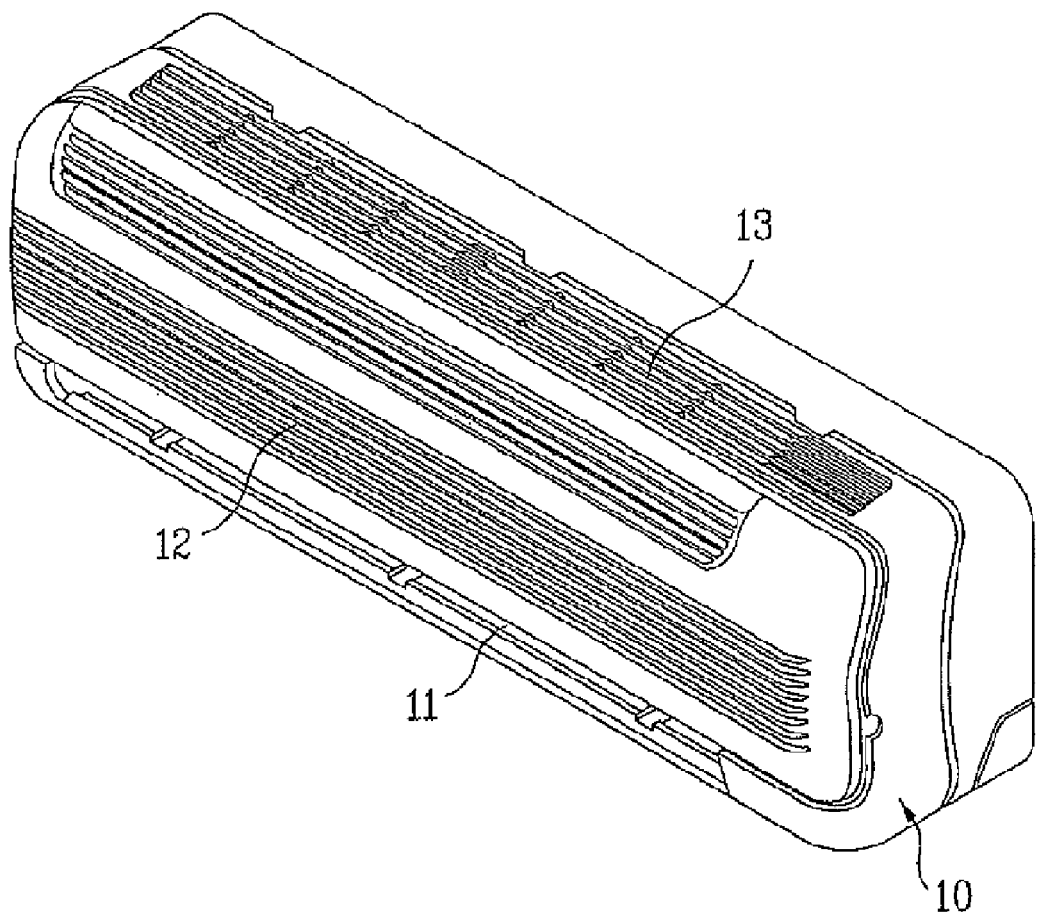
FIG. 1 illustrates a perspective view showing an indoor unit of an air conditioner in accordance with a related art.
Figure 2:
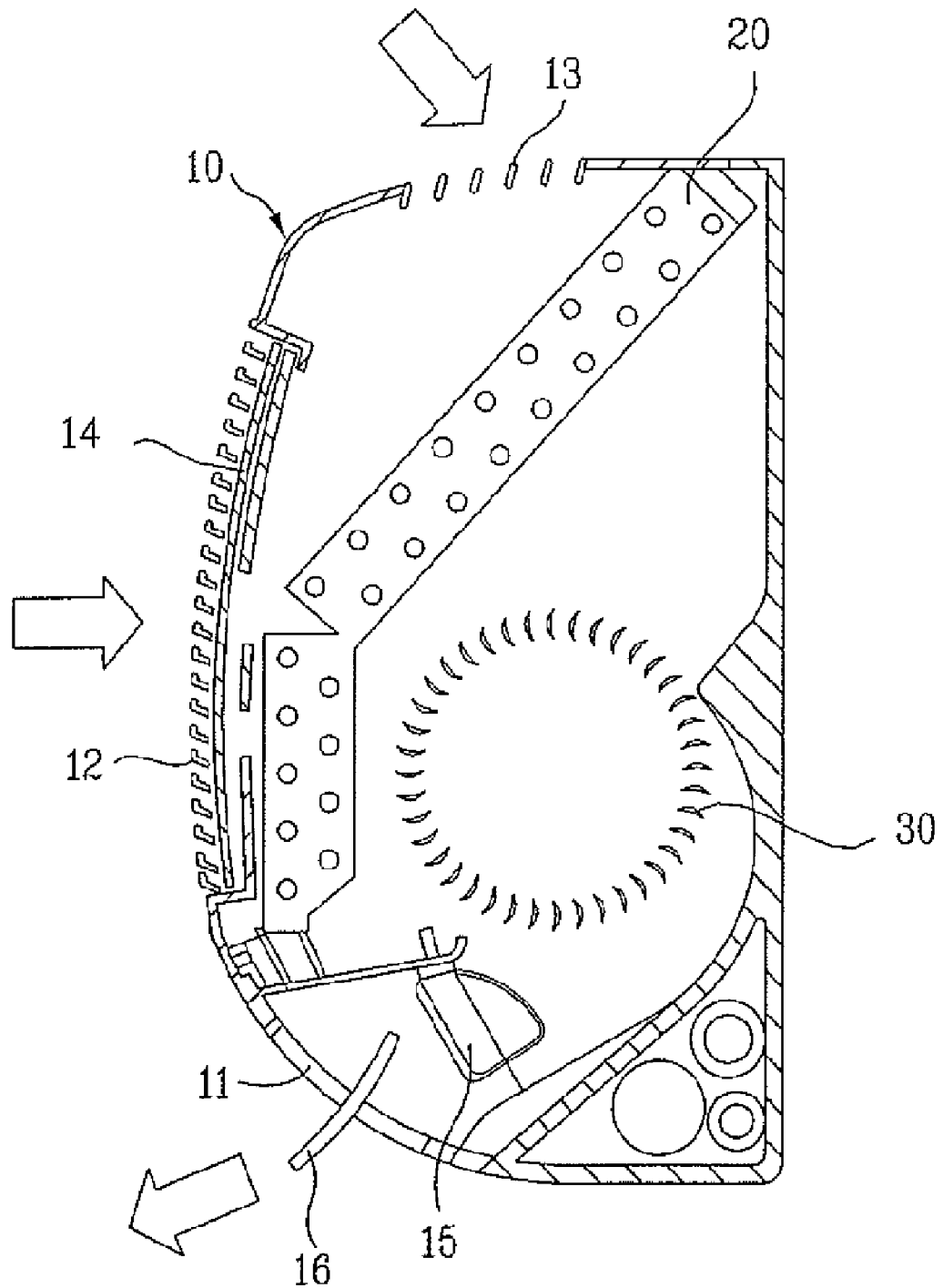
FIG. 2 illustrates a cross sectional view showing the indoor unit of the air conditioner in accordance with the related art.
Figure 3:
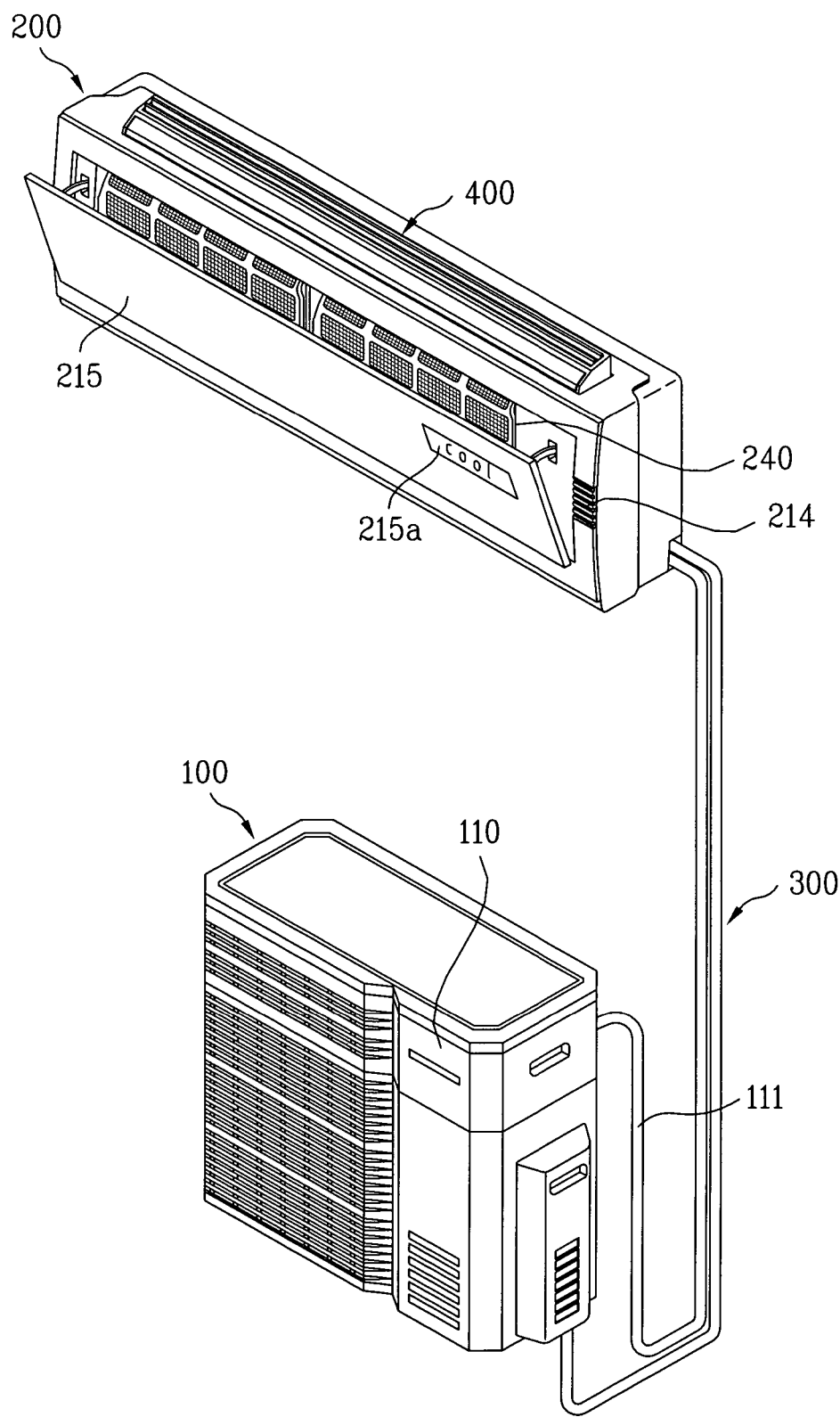
FIG. 3 illustrates a perspective view showing an air conditioner having a filter unit in accordance with a first embodiment of the present invention, in an operating state.
Figure 4:
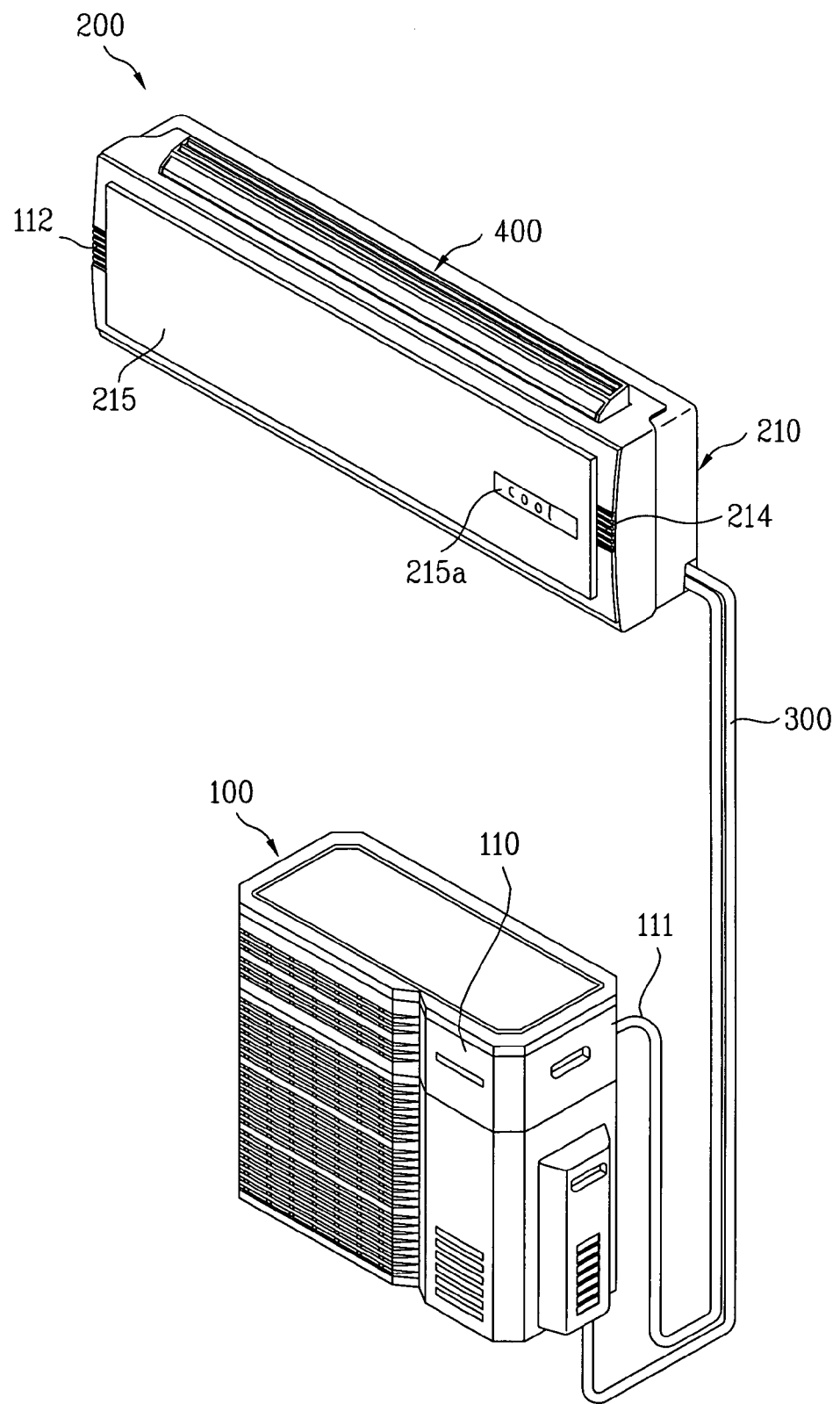
FIG. 4 illustrates a perspective view showing the air conditioner having the filter unit in accordance with the first embodiment of the present invention, in a stopping state.
Figure 5:
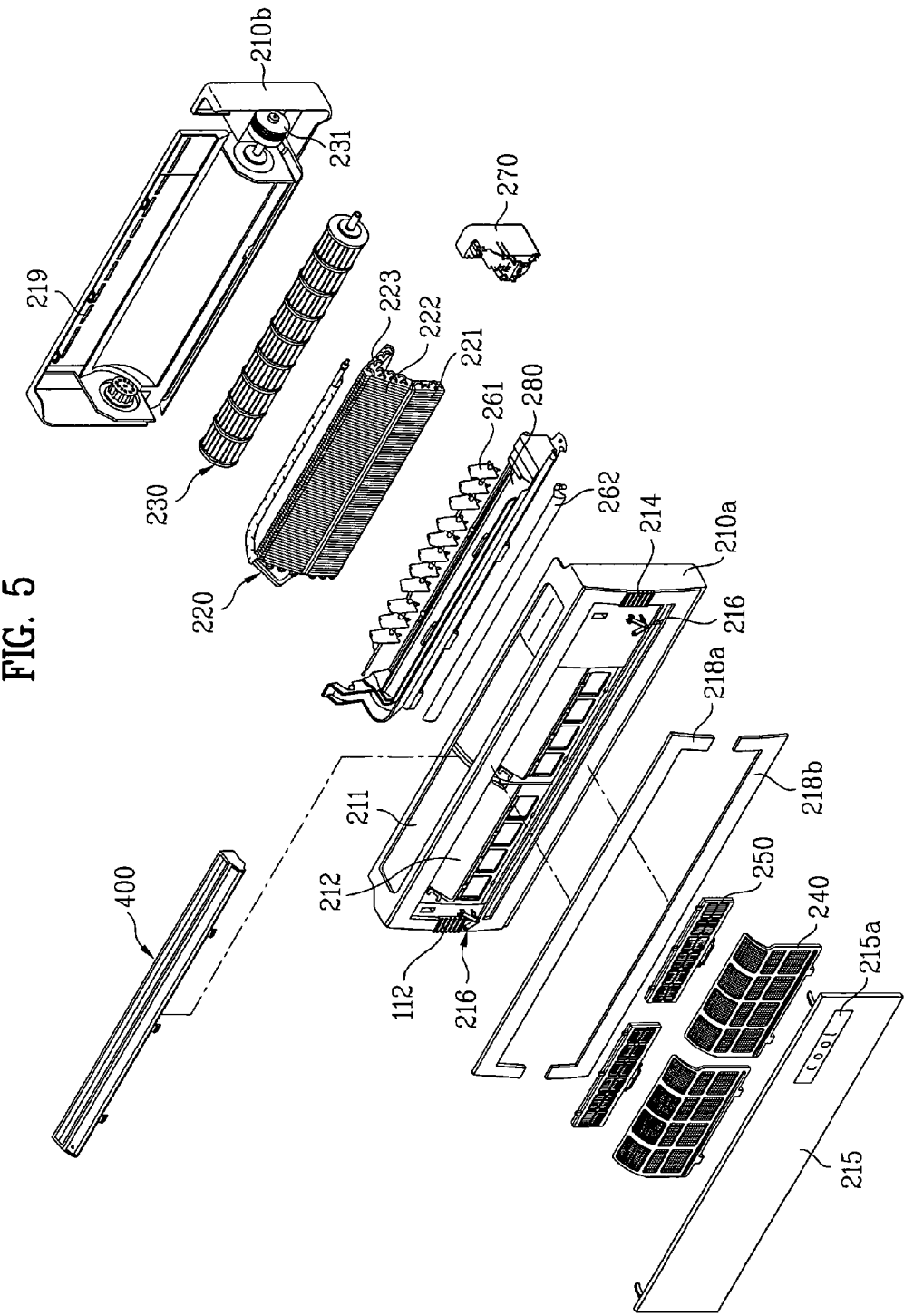
FIG. 5 illustrates showing a schematic perspective view showing an indoor unit having a filter unit in accordance with the present invention.
Figure 6:
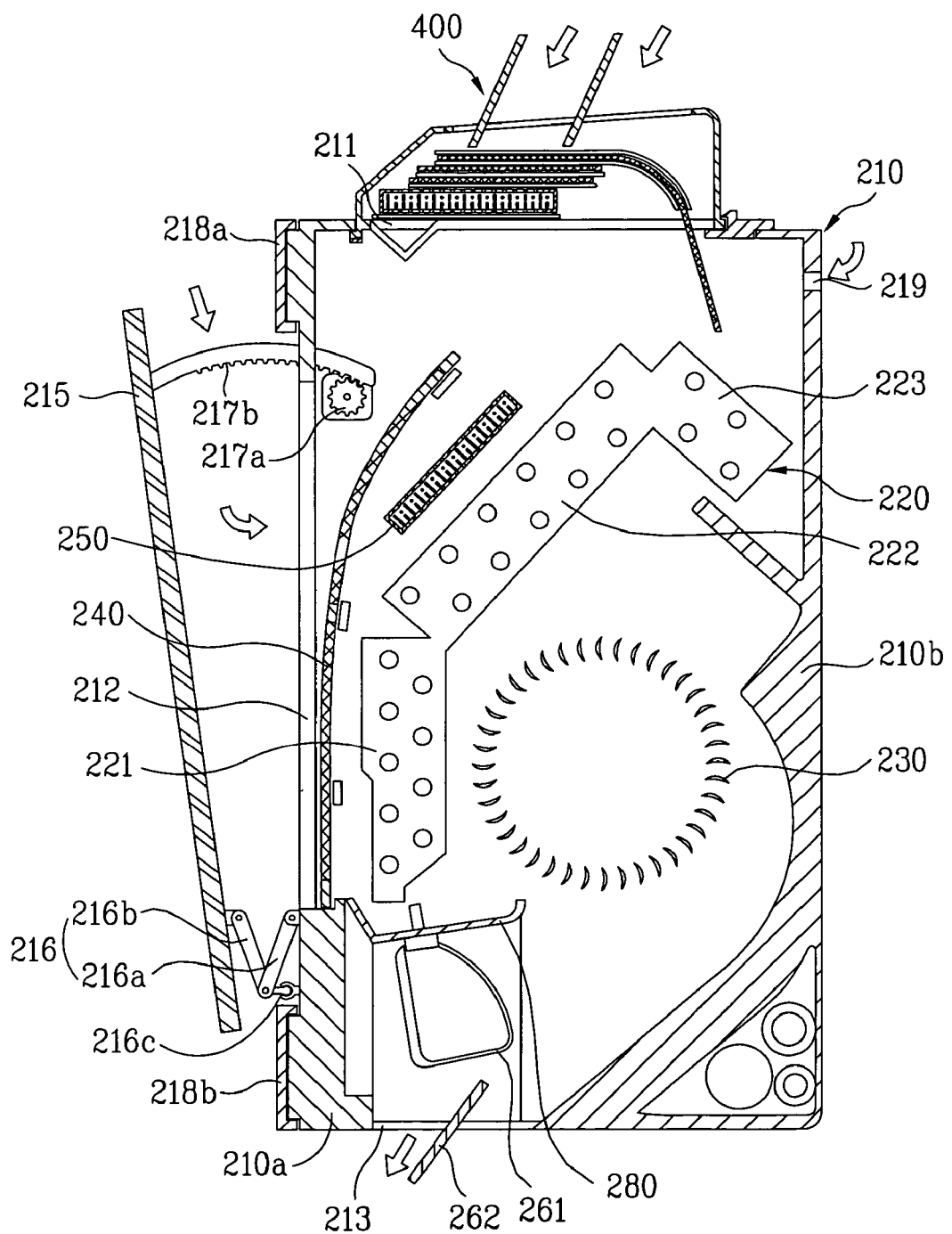
FIG. 6 illustrates a cross sectional view showing the indoor unit having the filter unit in accordance with the present invention.

A preferred embodiment of the present invention will be described with reference to the appended drawings. FIG. 3 illustrates a perspective view showing an operation state of an air conditioner having a filter unit in accordance with a first embodiment of the present invention. FIG. 4 illustrates a perspective view showing a stoppage state of the air conditioner having the filter unit in accordance with the first embodiment of the present invention. FIG. 5 illustrates showing a schematic perspective view showing an indoor unit having a filter unit in accordance with the present invention. FIG. 6 illustrates a cross sectional view showing the indoor unit having the filter unit in accordance with the present invention.

Referring to FIGS. 3 to 6, the air conditioner in accordance with the present invention includes an outdoor unit 100 provided at outside, an indoor unit 200 provided in the room and cooling/heating the room, and a refrigerant pipe connecting the outdoor unit 100 with the indoor unit 200.

The indoor unit 200 is provided with an outdoor heat exchanger (not shown) for heat exchanging with the outdoor air drawn into the outdoor unit, a compressor (not shown) for compressing and discharging the refrigerant, and an expander (not shown) for expanding the refrigerant, and an oxygen generator 110 or a humid air generator (not shown) is provided at a side of the outdoor unit 100.

The oxygen generator 110 being an apparatus for generating fresh oxygen is connected with the indoor unit 200 via an oxygen supply pipe 111.

Accordingly, the oxygen generated from the oxygen generator 110 is supplied to the indoor unit 200 through the oxygen supply pipe 111, and the oxygen supplied to the indoor unit 200 is supplied to the room through an oxygen discharging hole 112 provided on a front surface of the indoor unit 200.

As a first embodiment of an indoor unit having the filter unit in accordance with the present invention, a wall mounting type indoor unit 200 among indoor units of a separate type air conditioner will be described hereunder.

Referring to FIGS. 5 and 6, the indoor unit 200 includes a cabinet 210 having at least one air inlet and at least one air outlet and having a predetermined space formed therein, an indoor heat exchanger 220 provided in the cabinet, a fan 230 provided in the cabinet and forcing air movement, and a filter unit 400 for providing purified air to the cabinet.

A first air inlet 211 for drawing in the air from outside of the cabinet, i.e., the room air is provided on an upper surface of the cabinet, and a second air inlet 212 for drawing in the room air is provided on a front surface of the cabinet 210.

An air outlet 213 for discharging cooled/heated air is provided at a lower part of the cabinet 210. In this case, it is desirable that the air outlet 213 is provided on a bottom surface of the cabinet 210 so as to discharge the air to under the cabinet 210. In more detail, the cabinet 210 includes a front cabinet 210a having an opened rear portion, and a rear cabinet 210b having an opened front portion.

The first air inlet 211 is provided on a top surface of the cabinet 210a. and the second air inlet 212 is provided on a front surface thereof, and the air outlet 213 is provided on a bottom surface thereof.

The oxygen discharging hole 112 is provided on a left side of the front edge of the front cabinet 210a. and an operation controller 214 is provided on a right side thereof for controlling the operation of the indoor unit 200 and displaying the operation information of the air conditioner. The locations of the oxygen discharging hole 112 and the operation controller 214 can be switched to each other.

In this case, the operation controller 214 includes a printed circuit board, a plurality of LEDs soldered in the printed circuit board, and a diffusion board provided in front of the LED and diffusing the LED lights. A switch (not shown) provided at the rear of the operation controller 214 is in contact with the printed circuit board so as to input the operation information of the air conditioner.

A front filter 240 for filtering impurities contained in the air drawn in through the second air inlet 212 is provided at a front portion of the front cabinet 210a. and an electric dust collector 250 for ionizing and collecting the impurities contained in the air drawn in through the second air inlet 212 is provided at a rear portion of the front filter 240.

A front panel 215 for opening/closing the second air inlet 212 is provided on a front surface of the front cabinet 210a. and a display member 215a including an LCD or LED for displaying the operation information of the air conditioner is provided at a side of the front surface of the front panel 215.

In this case, the front panel 215 may be provided with a mirror, a color panel, or a frame. The front panel 215 is rotatably provided to rotate frontward around a lower part of the front panel so as to open/close the second air inlet 212 according to the operation of the indoor unit.

In other words, the front panel 215 is configured to open the second air inlet 212 during the operation of the indoor unit 200 and to close the second air inlet 212 during the stoppage of the indoor unit. The front panel 215 is configured to locate at a front lower part of the cabinet 210.

For this reason, the front panel 215 is connected to the front cabinet 210 via a link member 216. The link member 216 includes a first link 216a rotatably connected to a lower part on a front surface of the front cabinet 210, and a second link 216b having a first end rotatably connected to a second end of the first link 216a and a second end rotatably connected to a lower rear surface of the front panel 215.

In this case, the first end of the first link 216a is hinge coupled with the front cabinet 210a and a second end thereof slants downward and extends. A fixing member 216c is protruded from a lower part of the first end of the first link 216a to a front thereof so as to selectively fix the second end of the first link 216a. In other words, the fixing member 216c fixes the second end of the first link 216a when the front panel 215 is rotated for opening/closing the second air inlet 212.

When the front filter is placed or withdrawn, the first link 216a is released from the second end so as to completely open the front panel 215 and locate at a front lower part of the cabinet 210.

A pinion 217a for rotating the front panel 215 is provided at an upper part of the front cabinet 210, and a rack 217b meshed with the pinion 217a is protruded rearward from an upper rear surface of the front panel. In this case, it is desirable that the pinion 217a is rotated through a motor and the rack 217b is formed in an arc shape.

In addition, a top decorative panel 218a and a bottom decorative panel 218b are provided at a front edge of the front cabinet 210 except a portion having the oxygen discharging hole 112 and the operation controller 214 formed thereon.

It is desirable that a third air inlet 219 is provided at a rear upper part of the rear cabinet 210b so as to minimize air suction resistance. At least one louver 261 for controlling a left/right direction of the air discharged through the air outlet is rotatably provided at an inner lower part of the front cabinet 210a. and a vein 262 for controlling an up/down direction of the air discharged through the air outlet 213 is rotatably provided at the air outlet 213.

The fan 230 forces air movement such that the room air is drawn in through the first air inlet 211, the second air inlet 212 and the third air inlet 219 of the cabinet 210. A heat exchange is carried then out and the air is discharged through the air outlet 213 to the room.

In this case, the fan 230 includes a cross flow fan driven by the motor 231, and provided to be long in the left/right direction on the inside of the rear cabinet 210b. and a control box 270 for controlling the operation of the air conditioner in accordance with the present invention is provided at a front side of the motor 231 for rotating the fan 230.

The heat exchanger 220 is provided between the air inlets 211, 212, 219 of the cabinet and the fan 230 so as to cool/heat the air drawn in through the air inlets 211, 212, 219 of the cabinet.

The heat exchanger 220 includes a vertical member 221 vertically provided at a rear of the second air inlet 212, a first sloping member inclined toward the rear from an upper end of the vertical member 221, and a second sloping member 223 declined toward the rear from the upper end of the first sloping member 222.

In this case, the vertical member 221 exchanges heat mainly with the air drawn in from the second air inlet 212, the first sloping member 222 mainly with the air drawn in from the first air inlet 211, and the second sloping member 223 mainly with the air drawn in from the third air inlet 219. A condensed water reservoir 280 is provided at an inner lower part of the front cabinet 210, preferably, at a lower part of the vertical member 221 of the indoor heat exchanger 221.

Figure 7:
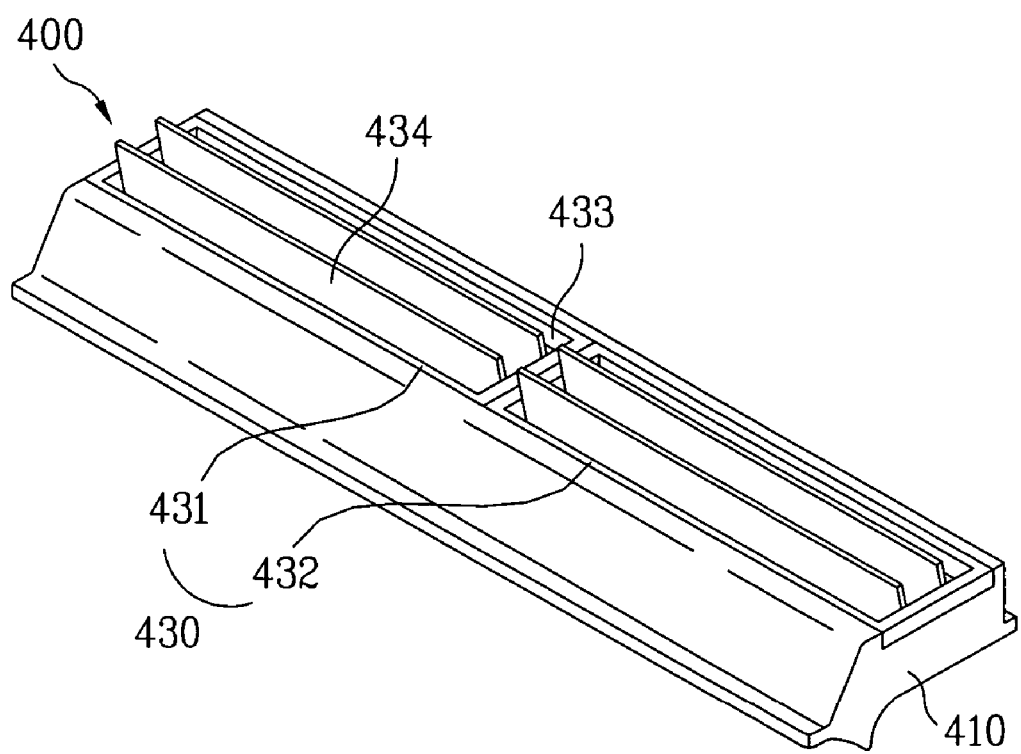
FIG. 7 illustrates a perspective view showing a filter unit in accordance with a first embodiment of the present invention.
Figure 8:
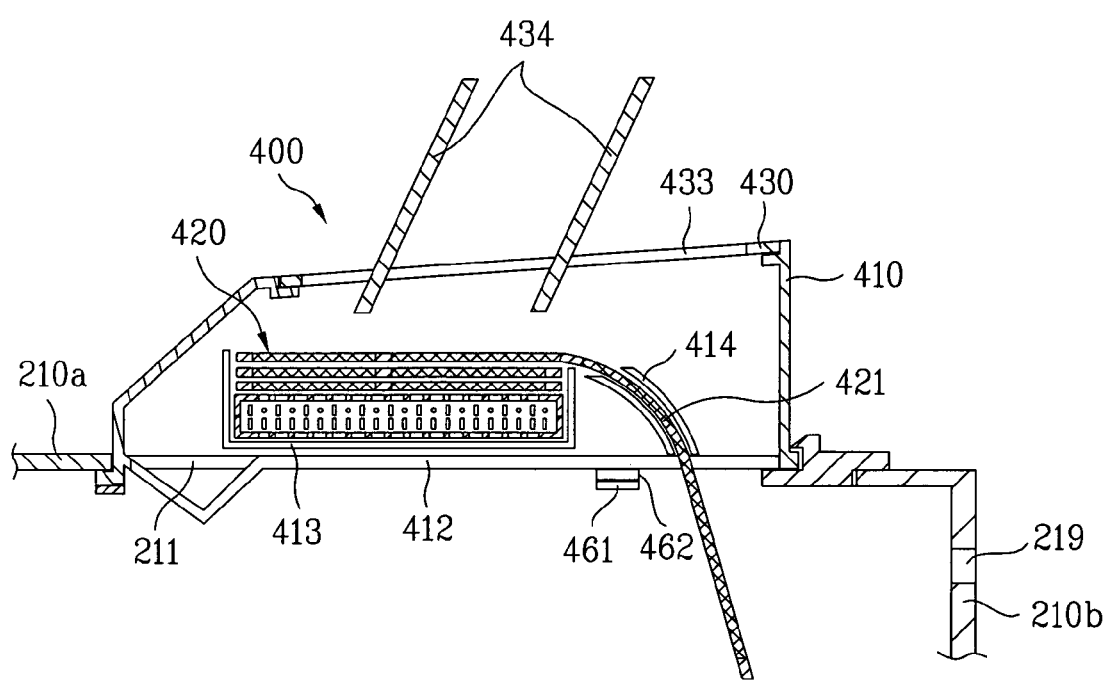
FIG. 8 illustrates a cross sectional view showing a filter unit provided at the indoor unit of the air conditioner in accordance with a first embodiment of the present invention.
Figure 9:
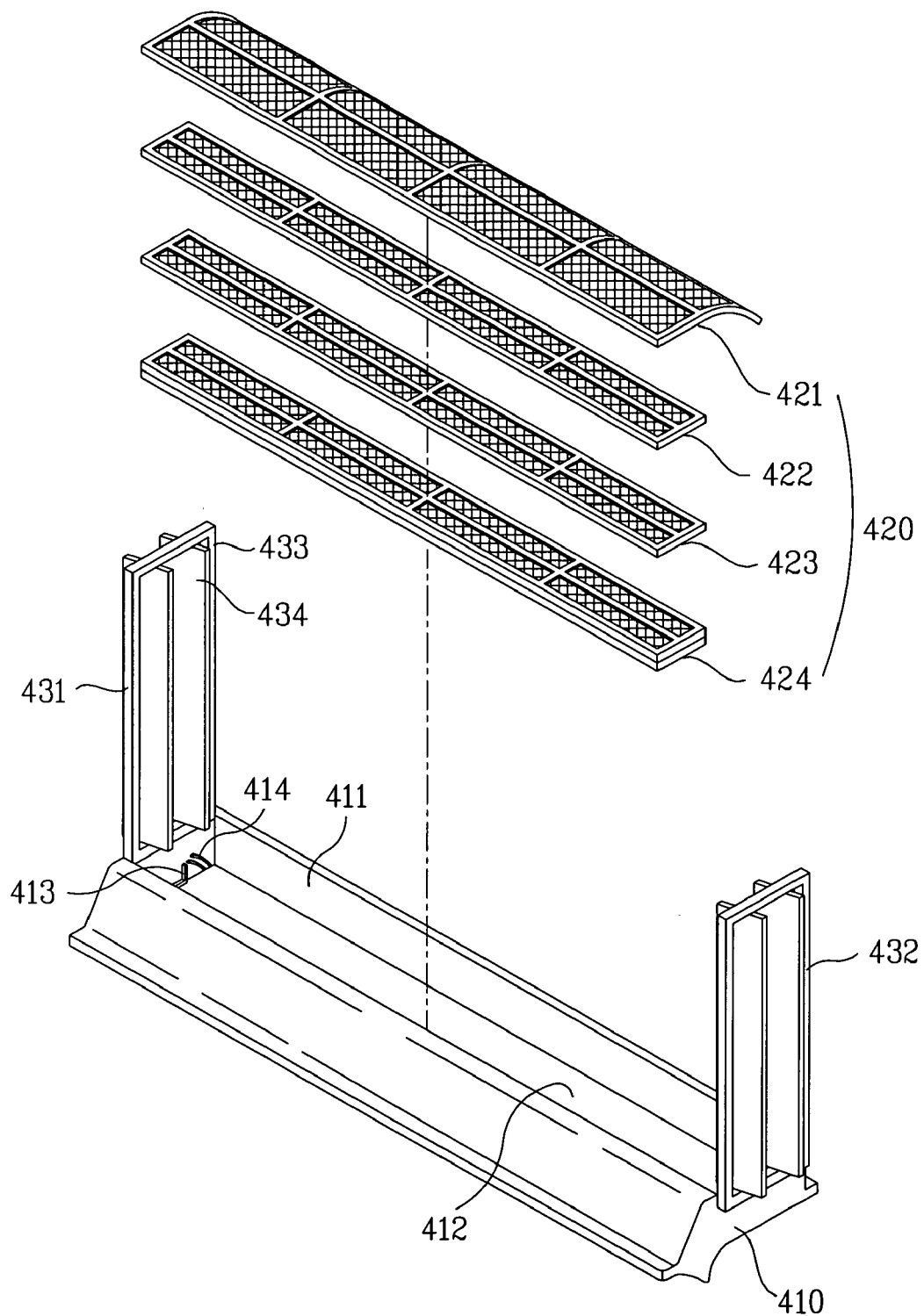
FIG. 9 illustrates a perspective view showing a state that the filters are taken out from the filter unit in accordance with the first embodiment of present invention.

Meanwhile, the filter unit 400 is provided on an upper surface of the cabinet so as to provide the purified air to the cabinet 210 after drawing in and purifying the room air. Hereinafter, the first embodiment of the filter unit 400 in accordance with the present invention will be described with reference to FIG. 7 to FIG. 9. FIG. 7 illustrates a perspective view showing a filter unit in accordance with a first embodiment of the present invention. FIG. 8 illustrates a cross sectional view showing a filter unit provided at the indoor unit of the air conditioner in accordance with a first embodiment of the present invention. FIG. 9 illustrates a perspective view showing a state that the filters are taken out from the filter unit in accordance with the first embodiment of present invention.

Referring to FIG. 7 to FIG. 9, the filter unit 400 includes a filter case 410 provided on an outer surface, particularly, on an upper surface of the cabinet, and a filter member 420 accommodated in the filter case 410 and purifying the air.

In this case, it is desirable that the filter member 410 is detachably provided at an upper part of the first air inlet 211 of the cabinet 210. A filter gate is provided at the filter case 410 through which the filter member 420 is entered and exited, and the filter gate 411 is opened/closed by a cover 420 provided at the filter case 410. A purified air outlet 412 communicating with the first air inlet 211 of the cabinet is provided on a floor of the filter case.

In the present embodiment, the filter gate 411 is provided o top surface of the filter case 410, and the cover 430 is rotatably connected to a side of an edge of the filter gate 411 so as to open/close the filter gate 411.

In this case, the cover 430 includes a firs panel 431 having a side rotatably connected to the edge of the filter gate 411, and a second panel 432 having a side rotatably connected to the edge of the filter gate 411.

In more detail, a left end of the first panel 431 is rotatably connected to a left edge of the filter gate 411, and a right end of the second panel 432 is rotatably connected to the right edge of the filter gate 411.

In other words, viewed from a front surface of the filter case 410, the first panel 431 opens a left side of the filter gate 411, rotating upward and counterclockwise, and the second panel 432 opens a right side of the filter gate 411, rotating upward and counterclockwise.

The first panel 431 and the second panel 432 included in the cover 430 are provided with at least one air inlet 433 for drawing in outside air, i.e., the room air into the filter case 410.

In addition to the aforementioned structure, it is desirable that the first panel 431 and the second panel 432 further include at least one louver 434 for opening/closing each air inlet 433 of the filter unit. In this case, the louver 434 is rotatably connected to an edge of the air inlet 433.

In more detail, a pivot (not shown) is protruded from both ends of the louver 434, respectively, and a hole (not shown) for accommodating the pivot is provided on both inner walls of the edge of the air inlet 433, respectively. One of the pivots of the louver 434 is connected to a louver use motor (not shown), and the louver 434 is automatically opened/closed during the operation of the air conditioner.

The louver 434 structured as mentioned above not only guides the room air to the filter member 420, the room air drawn in through the air inlet 433 but also closes the air inlet 433 so as to prevent the impurities from being entered into the filter case 410 when the air conditioner is stopped for a long time.

The filter member 420 accommodated in the filter case 410 includes at least one filter member 420. In more detail, the filter member 420 includes a first filter provided at a lower part of the air inlet 411, a nano copper filter 422 provided at a lower part of the first filter 421, a nano silver filter 423 provided at a lower part of the nano copper filter 422, and an electric dust collector 424 provided at a lower part of the nano silver filter 423 so as to ionize and collect the impurities. In other words, it is desirable that the filter member 420 includes a plurality of filters formed in layers.

In this case, it is desirable that at least one of the filters 421, 422, 423, and 424 is extended toward the third air inlet 219 of the cabinet so as to purify the air drawn in through the third air inlet 219 of the cabinet. In the present invention, the first filter 421 is extended to the third air inlet 219 of the cabinet.

The filter member 420 of course may further include the nano carbon filter and a hepa filter, and arrangement of the filters is not limited to the one aforementioned.

Meanwhile, a placement/withdrawal guide for guiding withdrawal of the filter member 420 is provided on an inner wall of the filter case 410. In this case, the placement/withdrawal guide guides the withdrawal of the filters 421, 422, 423, and 424, and supports the filters. For this reason, the placement/withdrawal guide includes a plurality of ribs 413 protruded from both inner walls of the filter case.

In the present embodiment, the filters 421, 422, 423, and 424 are replaced from an upper part of the filter case 410 and the ribs supports both sides of the filter member 420. For this reason, each rib 413 includes two vertical members having a long length and formed in an up/down direction, and a horizontal member for connecting lower ends of the vertical members.

It is desirable that at least one auxiliary rib 414 is further provided on the inner wall of the filter case 410, so as to support a extended to the inside of the third air inlet 219 of the cabinet.

To supply electric power to the filter unit 400 structured as mentioned above, a power source supplying substrate 461 is provided at the cabinet 210, and a power source applying substrate 462 is provided at the filter case 410, the power source applying substrate 462 coming into contact with the power source supplying substrate 461 during the installation of the filter unit 400.

The function of the air conditioner having the filter unit in accordance with the present invention structured as mentioned above will be described as follows.

First of all, when the power source is supplied to the air conditioner and the air conditioner starts to operate, a front panel 215 of the cabinet is rotated frontward so as to open the second air inlet 212 of the cabinet, and a vein 262 of the cabinet opens the air outlet 213 of the cabinet. Then a louver 434 of the filter unit 400 is rotated so as to open the filter unit.

When the second air inlet 212 of the cabinet and an air inlet 433 of the filter unit are opened, the fan 230 of the cabinet is rotated, and a compressor of the outdoor unit 100 and so on is operated so as to circulate the refrigerant.

Accordingly, the room air is drawn into the cabinet through the second air inlet 212 and the third air inlet 219 of the cabinet, and into the filter case 410 through the air inlet 433 of the filter unit 400.

In this case, the air drawn into the second air inlet 212 of the cabinet is purified at the front filter 240 of the cabinet and the electric dust collector 250, and the air drawn in through the third air inlet 219 is purified at the rear portion of the first filter 421 of the filter member 420, cooled/heated by the heat exchanger 400, and discharged to the room through the air outlet 213 of the cabinet.

In the process of discharging the air, the direction of the air discharged to the room is controlled by the louver 261 and the vein 262 provided at the air outlet 213 of the cabinet.

In the mean time, the room air drawn into the filter unit 400 is purified at the filter member 420 and passed through the purified air outlet 412 of the filter unit and the first air inlet 211 of the cabinet so as to be supplied to the cabinet 210.

The purified air passed through the first air inlet 211 and supplied to the cabinet 210 is cooled/heated in the heat exchanger 220, and then discharged through the air outlet 213 of the cabinet.

In more detailed description of the air purifying function via the filter member 420 of the filter unit, the room air drawn into the filter case 410 sequentially passes through the first filter 421, the nano copper filter 422, the nano silver filter 423, and the electric dust collector 424, and the impurities such as dust contained in the room air is filtered and sterilized, and the impurities such as dust particles are ionized and collected.

Since a large amount of impurities are stacked up on the filters 421, 422, 423, and 424 when the air conditioner having the filter unit 400 is driven for a long time, the filters 421, 422, 423, and 424 need to be taken out and cleaned, or replaced with new filters.

For this reason, a user opens the filter gate 411 by rotating upward the first panel 431 and the second panel 432 of the filter unit, respectively, so as to draw out the filters from the filter case 410 upward. The filters drawn out are cleaned and placed back to the filter case 410, or replaced with the new filters.

Figure 10:
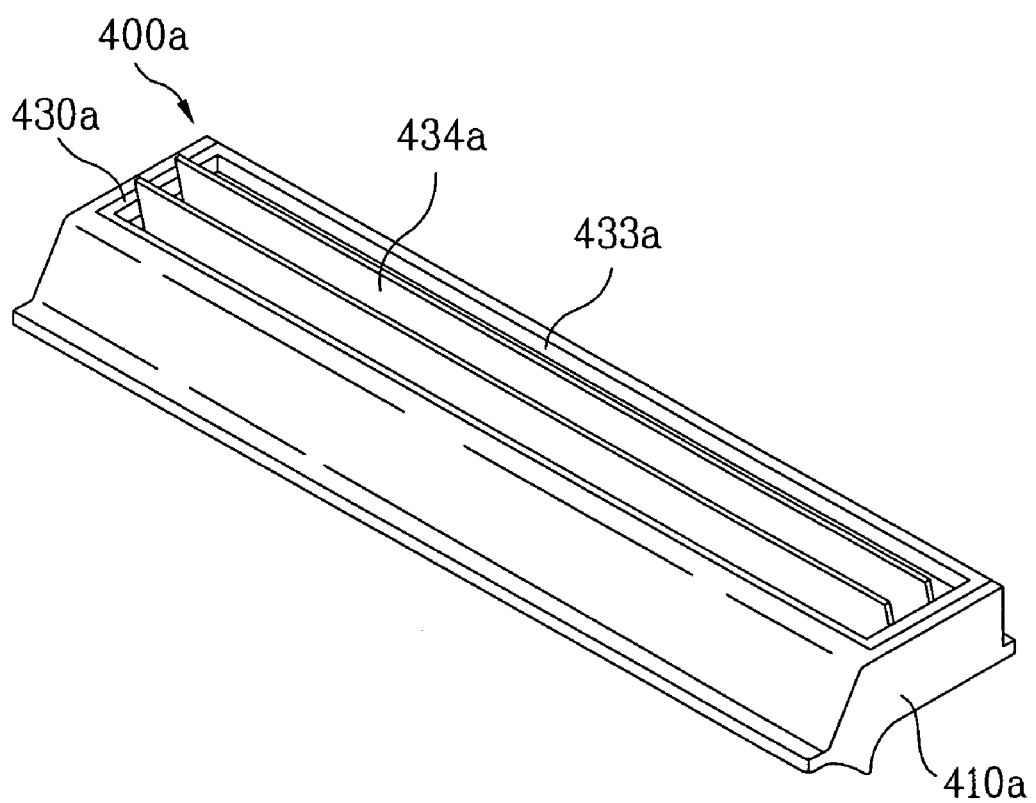
FIG. 10 illustrates a perspective view showing a filter unit in accordance with a second embodiment of the present invention.
Figure 11:
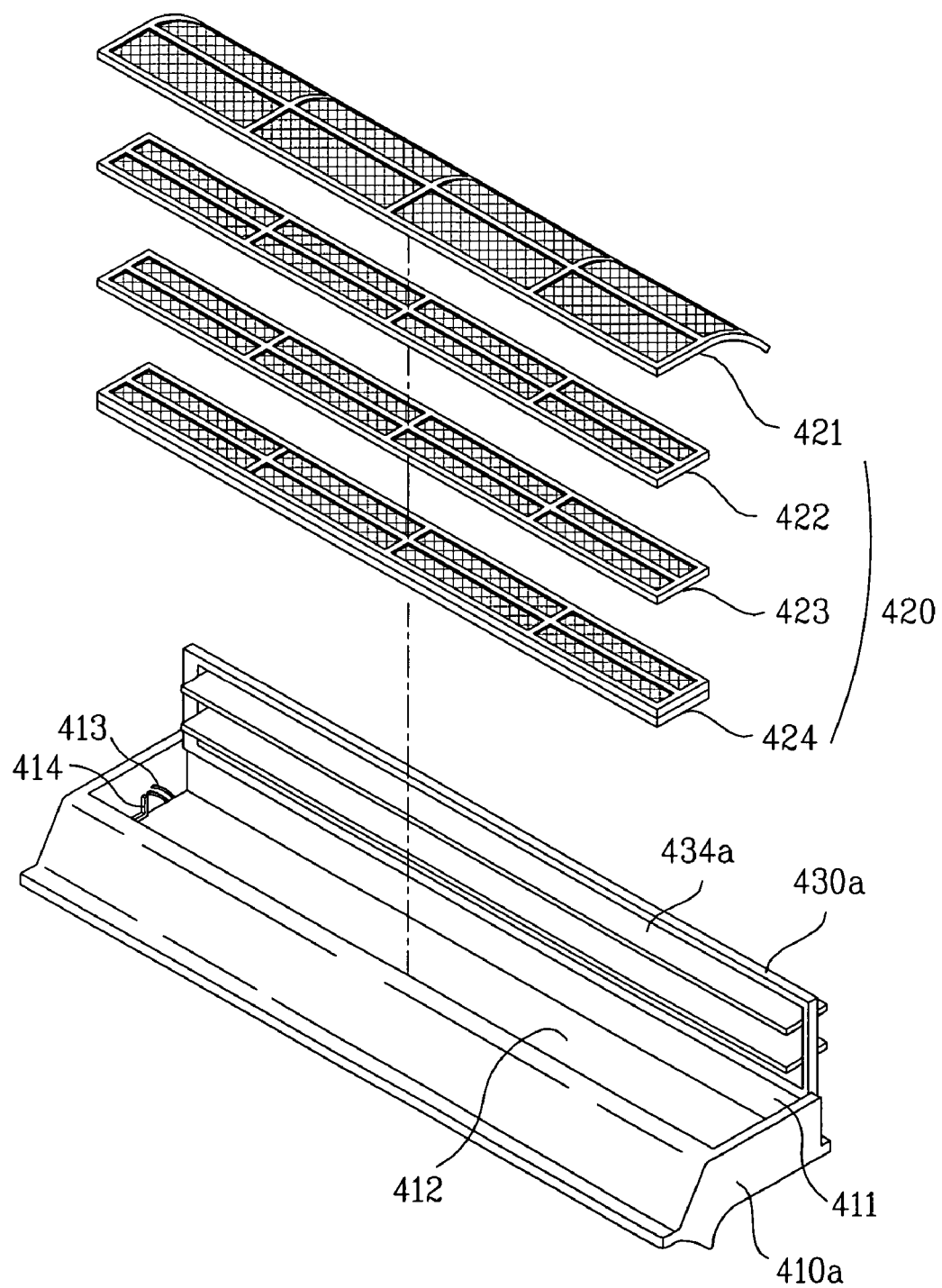
FIG. 11 illustrates a perspective view showing a state that filters are taken out from the filter unit in accordance with the second embodiment of the present invention.

Meanwhile, in FIGS. 10 and 11, a second embodiment of the filter unit having a cover 430a is illustrated, the cover 430a having a single panel and opening/closing the filter gate 411.

In the present embodiment, at least one air inlet 433a is provided at the cover 430a so as to draw in the outside air, i.e., the room air into the filter case 410a.

The cover 430a further includes at least one louver 434a for opening/closing each of the at least one air inlet 433a of the filter unit.

In the mean time, a rear end of the cover 430a is rotatably connected to a rear end of the edge of the filter gate 411 so as to open/close the filter gate 411.

Since other structural elements are the same as the first embodiment of the filter unit except the aforementioned structure, identical parts will be given the same names and reference symbols, and repetitive description of which will be omitted.

Figure 12:
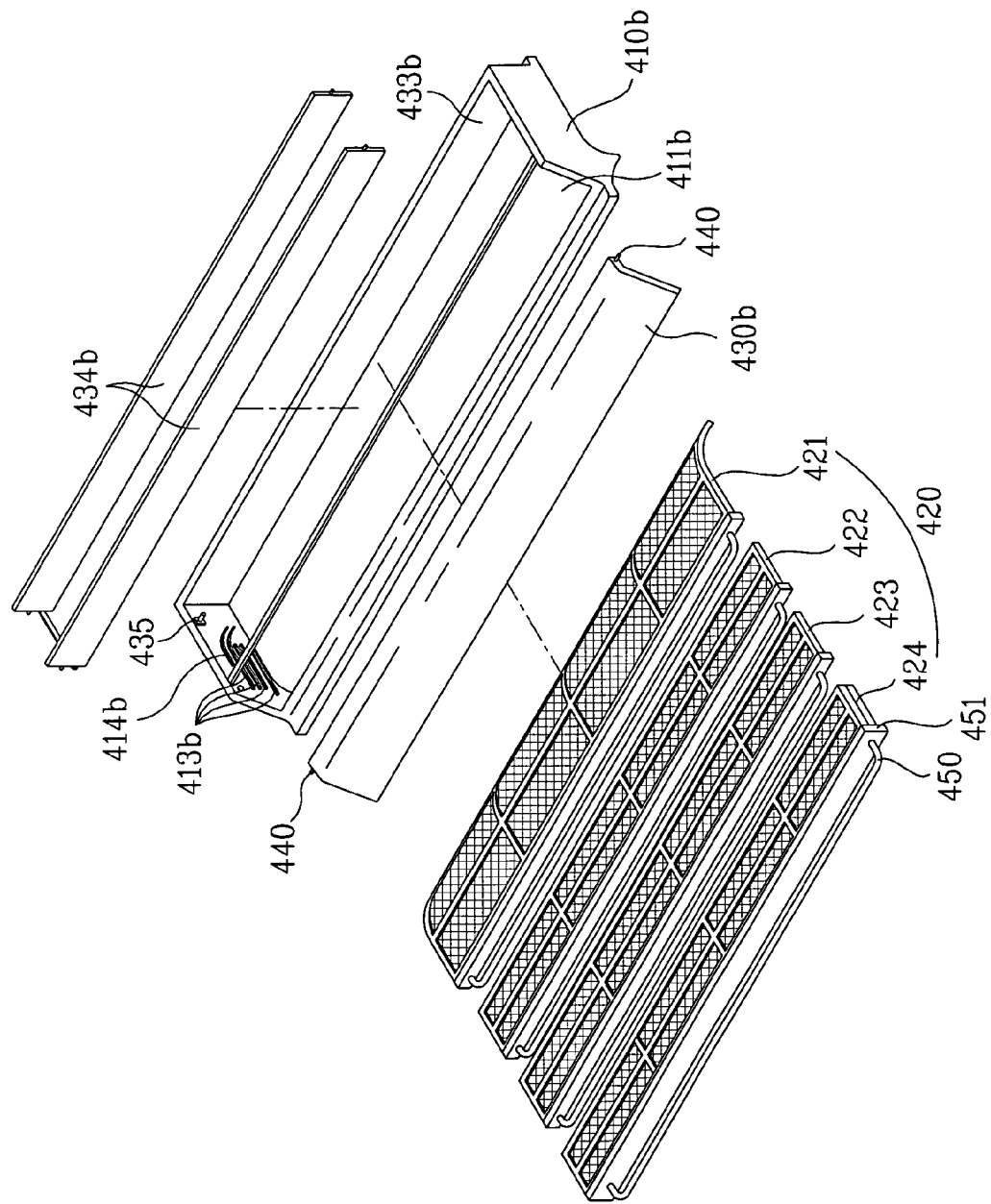
FIG. 12 illustrates a schematic perspective view showing a filter unit in accordance with a third embodiment of the present invention.
Figure 13:
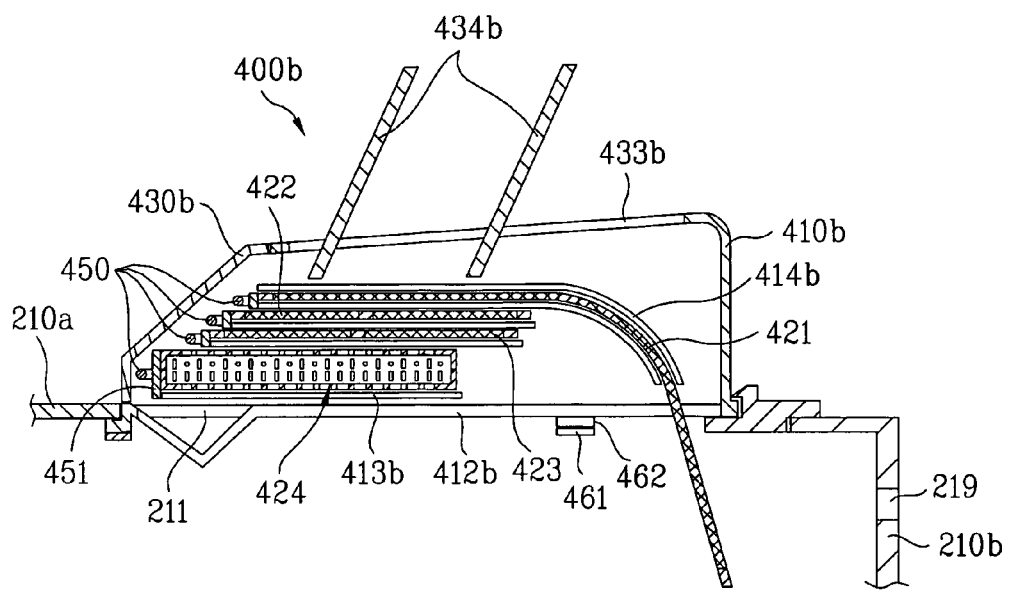
FIG. 13 illustrates a cross sectional view showing a filter unit in accordance with a third embodiment of the present invention.
Figure 14:
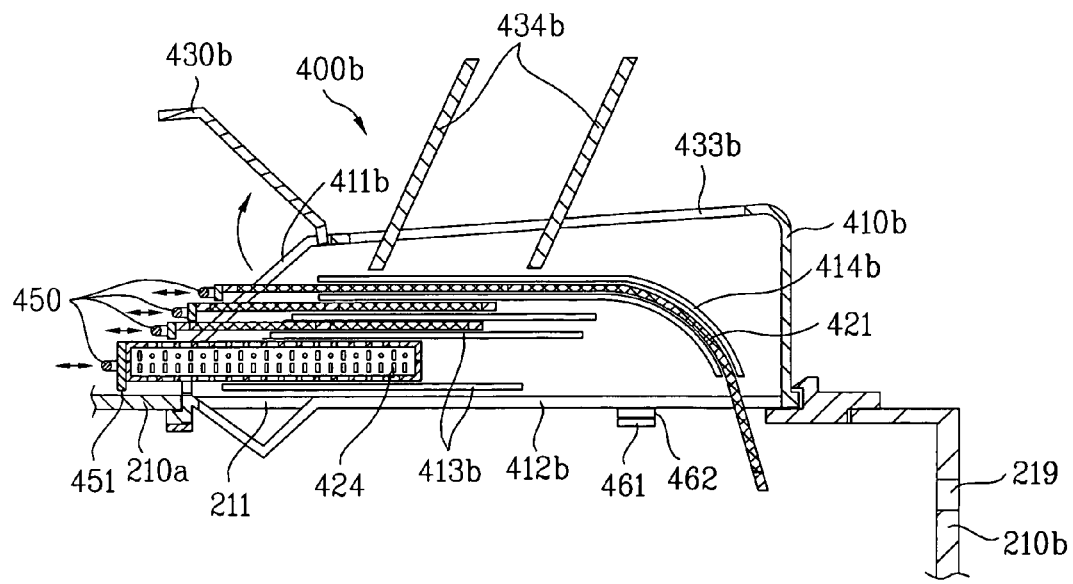
FIG. 14 illustrates a cross sectional view showing a state that filters are taken out from the filter unit in accordance with the third embodiment of the present invention.

In the following, referring to FIG. 12 to FIG. 14, the third embodiment of the filter unit in accordance with the present invention will be described. FIG. 12 illustrates a schematic perspective view showing a filter unit in accordance with a third embodiment of the present invention. FIG. 13 illustrates a cross sectional view showing a filter unit in accordance with a third embodiment of the present invention. FIG. 14 illustrates a cross sectional view showing a state that filters are taken out from the filter unit in accordance with the third embodiment of the present invention.

A filter unit 400b in accordance with the present invention includes a filter case 416b detachably provided on an upper surface of the cabinet 210 of the indoor unit, and the filter member 420 accommodated in the filter case 410b and purifying the air.

The filter case 410b includes a filter gate 411b for placing/withdrawing the filter member 420, an air inlet 433b for drawing in the room air, and a purified air outlet 412b for discharging the purified air from the filter member 420.

In this case, the filter gate 411b is provided on a front portion of the filter case 410b. and is opened/closed by a cover 430b rotatably provided at the filter case.

In this case, the cover 430b is rotated around an upper end thereof. For this reason, a pivot 440 protruded toward sides thereof is provided at both upper ends of the cover 430b. and a hole (not shown) into which each of the pivot 440 is inserted is provided on both inner walls of the edge of the filter gate 411b.

The air inlet 433b is provided on the upper surface of the filter case 410b. and the purified air outlet 412b is provided on a floor thereof so as to communicate wit the first air inlet 211 of the cabinet.

In this case, the filter case 410b includes at least one louver 434b for opening/closing the air inlet 433b. The louver 434b is rotatably connected to the edge of the air inlet 433b.

In more detail, a pivot (not shown) is protruded from both ends of the louver 434b. and a hole (not shown) for accommodating the pivot is provided on both inner walls of the edge of the air inlet 433b. respectively.

One of the pivots of the louver 434b is connected to a louver use motor (not shown) so as to open the louvers 434b during the operation of the air conditioner.

The louver 434b structured as mentioned above not only guides the room air to the filter member 420, the room air drawn in through the air inlet 433b. but also closes the air inlet 433b when the air conditioner is stopped for a long time, so as to prevent the impurities from being entered into the filter case 410b.

The filter member 420 accommodated in the filter case 410b includes at least one filter. The filter member 420b includes a nano copper filter 422 provided at a lower part of the first filter 421, a nano silver filter 423 provided at a lower part of the nano copper filter 422, and an electric dust collector 424 provided at a lower part of the nano silver filter 423 so as to ionize and collect the impurities.

The structure of the filter unit 420 is the same or similar to the first embodiment of the filter unit, and additional description of which will be omitted.

Meanwhile, a placement/withdrawal guide is provided on an inner wall of the filter case 410b so as to guide the filter member 420. In the present embodiment, the filters 421, 422, 423, and 424 are slid in/out from a front side of the filter case.

For this, the placement/withdrawal guide includes a plurality of ribs 413b protruded respectively from both inner walls of the filter case 410b so as to support lower parts of both ends of each filter.

In this case, it is desirable that each of the ribs 413b supports both lower ends of each of the filters 421, 422, 423, and 424, and, at the same time, binds both upper ends of the other filter provided at a lower part of the filter supported by each of the ribs 413b so as to prevent each filter from escaping upward.

For example, the rib for supporting the first filter 421 binds upper ends on both sides of the nano copper filter 422 provided at a lower part of the first filter 421, so as to prevent the nano copper filter 422 from escaping upward.

It is desirable that the placement/withdrawal guide further includes an auxiliary rib 414b for supporting both ends of the upper part of the first filter 421 provided at an upper part of the rib that supports both ends of the lower part of the first filter 421.

Accordingly, the filters 421 and 422 provided in the third embodiment of the filter unit are placed or withdrawn to/from the filter case in layer.

It is desirable that the auxiliary rib 414b and the rib 413b for respectively supporting both upper and lower ends of the first filter 421 are extended toward the third air inlet 219 of the cabinet, so as to support the rear portion of the first filter 421 elongated toward the third air inlet 219 of the cabinet.

In addition to the aforementioned structure, the filter unit 410b further includes a filter drawer for withdrawing the filter member 420. The filter drawer includes a filter handle 450 provided at a front end of each of the filters 421, 422, 423, and 424.

It is desirable that a stopper 451 being caught by the front end of the rib 413b is provided at a side of the filter handle 450 during installation of the each of the filters 421, 422, 423, and 424. The stopper 451 is provided at a rear end of each of the ribs, and may support the rear end of each of the filters when the filters are placed or withdrawn.

When the each of the filters 421, 422, 423, and 424 is desired to be placed in the filter case 410b. the user opens the cover 430b of the filter gate, holds the filter handle 450, and slides each filter in.

In this instance, the stopper 451 prevents the filters 421, 422, 423, and 424 from being placed too deeply.

To supply a power source to the filter unit 400 structured as mentioned above, the power source supplying substrate 461 is provided at the cabinet 210, and the power source applying substrate 462 is provided at the filter case 410, the power source applying substrate 462 coming into contact with the power source supplying substrate 461 during the installation of the filter unit 400.

Figure 15:
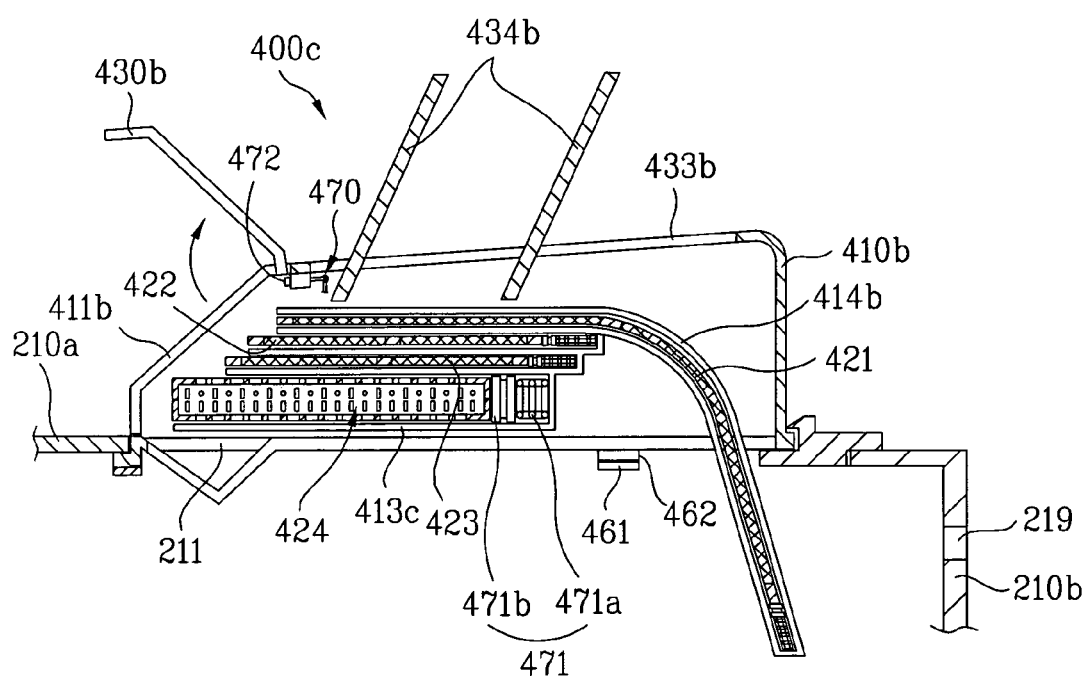
FIG. 15 illustrates a cross sectional view showing a state that a filter unit is provided in an indoor unit of an air conditioner in accordance with a fourth embodiment of the present invention.
Figure 16:
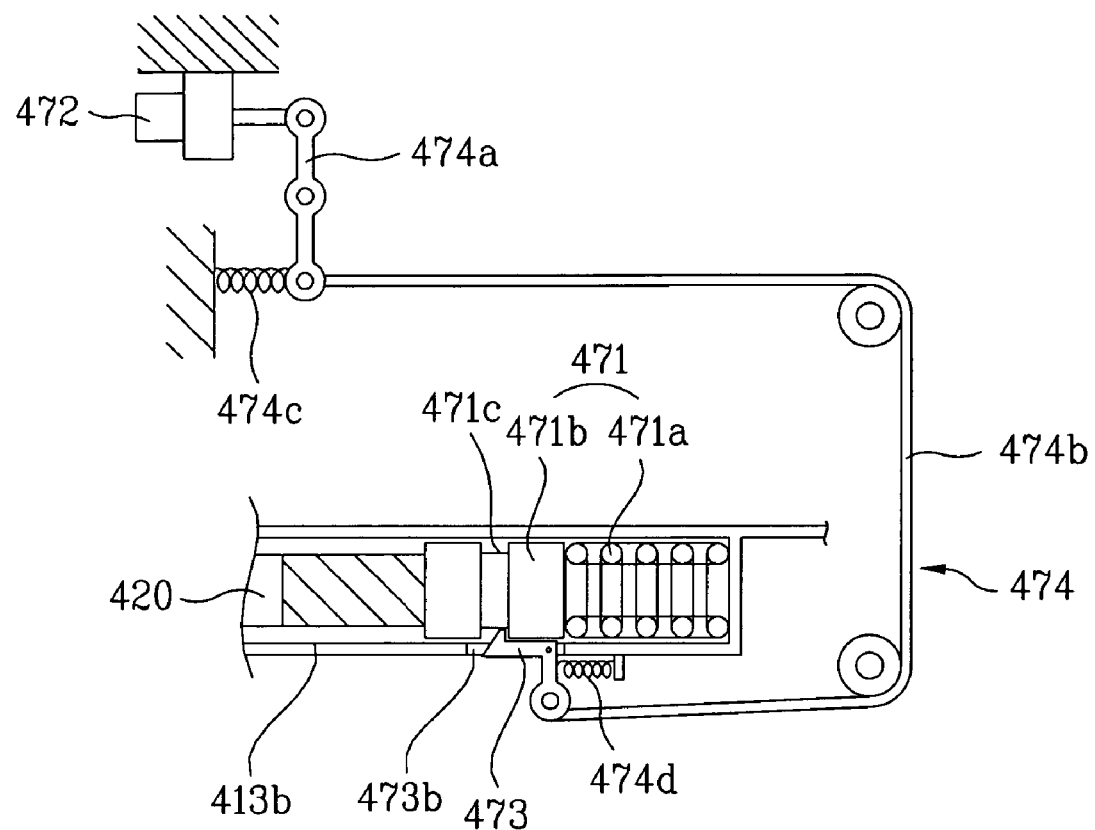
FIG. 16 illustrates a perspective view showing a structure of a filter retriever provided in the filter unit in accordance with the fourth embodiment of the present invention.
Figure 17:
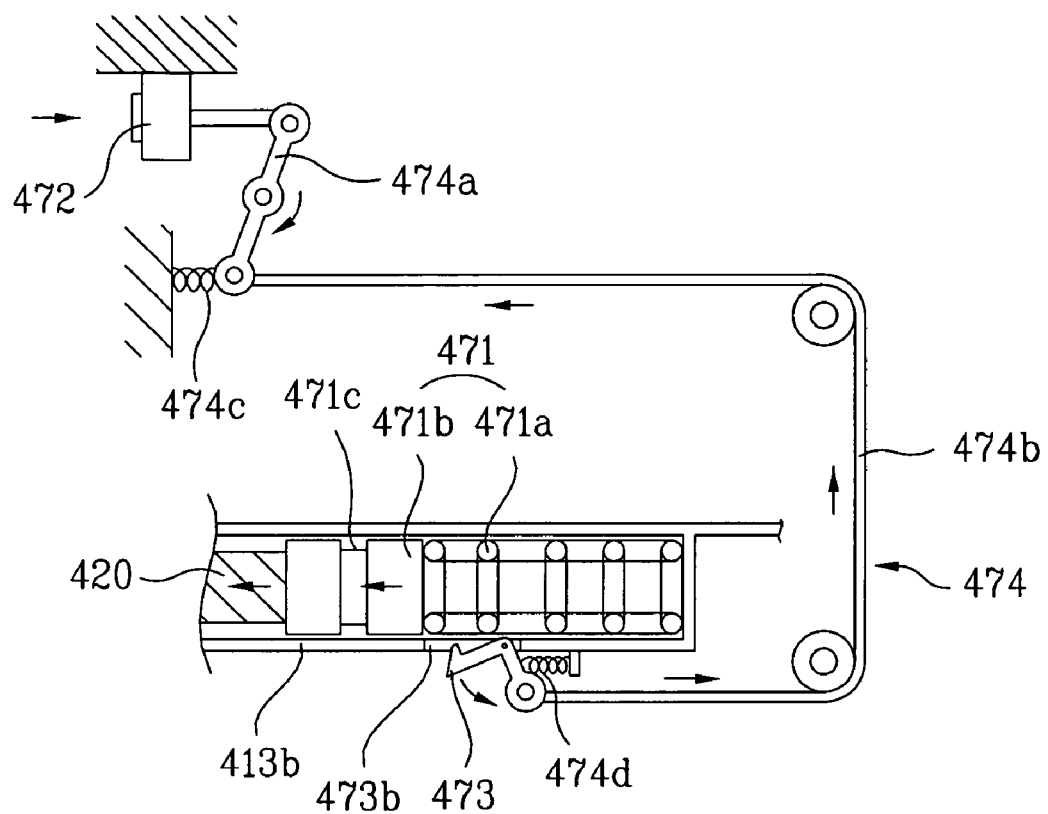
FIG. 17 illustrates a diagram showing the action of a filter drawer of FIG. 16 when the filter is withdrawn.

Referring to FIG. 15 to FIG. 17, a fourth embodiment of the filter unit in accordance with the present invention will be described hereunder. FIG. 15 illustrates a cross sectional view showing a state that a filter unit is provided in an indoor unit of an air conditioner in accordance with a fourth embodiment of the present invention. FIG. 16 illustrates a perspective view showing a structure of a filter drawer provided in the filter unit in accordance with the fourth embodiment of the present invention. FIG. 17 illustrates a diagram showing an action of a filter drawer of FIG. 16 during retrieving the filter.

In describing the fourth embodiment of the filter unit in accordance with the present invention, other structural elements except the filter drawer for withdrawing the filter are the same as the third embodiment of the filter unit aforementioned, therefore, the same number will be used for the same structure, and description of which will be omitted.

The filter drawer provided at the filter unit 400c of the air conditioner in accordance with the present invention includes an elastic means 471 provided at a side of the each of the filters 421, 422, 423, and 424, and the filter case 410b so as to apply a restoring force to the filter in a withdrawing direction of the each of the filters 421, 422, 423, and 424, and a restoration controller for controlling the restoration of the elastic means. In the present embodiment, it is desirable that at least one of the elastic means 471 is provided at each of the filters 421, 422, 423, and 424.

Hereinafter, examples of the filter drawer will be described, the filter drawer provided for withdrawing the electric dust collector 424 from one of the filters 421, 422, 423, and 424.

It is desirable that the elastic means 471 is provided on both inner walls of the filter case 410b. In more detail, in the condition being combined or separated to/from the filter case 410b. a first side of the elastic means 471 is supported by the filter case 410b. and a second side thereof applies elasticity to the electric dust collector 424 when the electric dust collector 424 is installed.

In other words, the rear end of the elastic means 471 is connected to the rib 413c for guiding the placement/withdrawal of the electric dust collector 424, or separated from the rib 413c so as to be supported by the rear end of the ribs 413c.

In this instance, the elastic means 471 includes a spring member 471a. and a filter supporting member 471b provided in front of the spring member 471b and supporting the filter.

In condition of being combined/separated to/from the spring member 471a, the filter supporting member 471b is provided on both left and right inner sides of the filter case 410b so as to be slid along the rib 413c in a forward/backward direction.

The restoration controller includes the elastic means 471, a fixing means 473 for fixing, particularly, the spring member 471a. and a releaser 472 and 474 for releasing the elastic means 471 fixed by the fixing means 473.

The fixing means 473 includes a hook member provided at the filter case 410b and binding one of the electric dust collector 424 or the elastic means 471.

In the present embodiment, the hook member is rotatably provided on an inner wall of the filter case 410b and passes through the rib in up/down direction. The hook member is caught by a recess provided at the filter supporting member 471b of the elastic means so as to fix the elastic means in the form being changed.

It is desirable that a restoring spring 474d for rotating the hook member is provided at a first end of the hook member in a direction that the hook member is caught by the recess 471c provided at the filter supporting member 471b.

The releaser 472 and 474 includes a withdrawal button 472 provided at the filter case 410b. and a link member 474 having a first end connected to the withdrawal button 472 and a second end connected to the fixing means 473.

In other words, the filters 421, 422, 423 and 424 provided at the filter unit in accordance with the present invention is withdrawn by a one-touch method. In this case, the withdrawal button 472 is provided at an edge of the filter gate 411b and exposed when the cover 430b is opened.

The link member 474 includes a first link 474a having a first end connected to a rear end of the withdrawal button 472 and rotated according to the pressing of the withdrawal button, a first spring 474c connected to a second end of the first link 474a and elastically supporting the first link 474a. and a second link 474c connected to the second end of the first link 474a and the hook member.

Accordingly, if the user presses the withdrawal button 472 when the cover 430b of the filter case is opened, the second link 474c rotates the hook member to a side thereof by a rotation of the first link 474a.

Therefore, the elastic means 471 is released, and the elastic means 471 is restored, and the electric dust collector 424 is withdrawn in a forward direction of the filter case 410b by the restoring force of the elastic means 471.

On the contrary, when the withdrawal button is released, the hook member is rotated to a second side thereof by the restoring spring 474d connected to the first spring 474c and the hook member.

In this case, the withdrawal button 472 is linked to all link member 474 corresponding to each of the filters 421, 422, 423, and 424 so as to withdraw all the filters when the withdrawal button 472 is pressed. Besides, one withdrawal button 472 may be provided every link member 474 so as to withdraw one of the filters 421, 422, 423, and 424. In the present invention, the withdrawal button 472 is, but not limited to, a push button.

In the following, referring to FIG. 18 to 23, the fifth embodiment of the filter unit in accordance with the present invention will be described.

Figure 18:
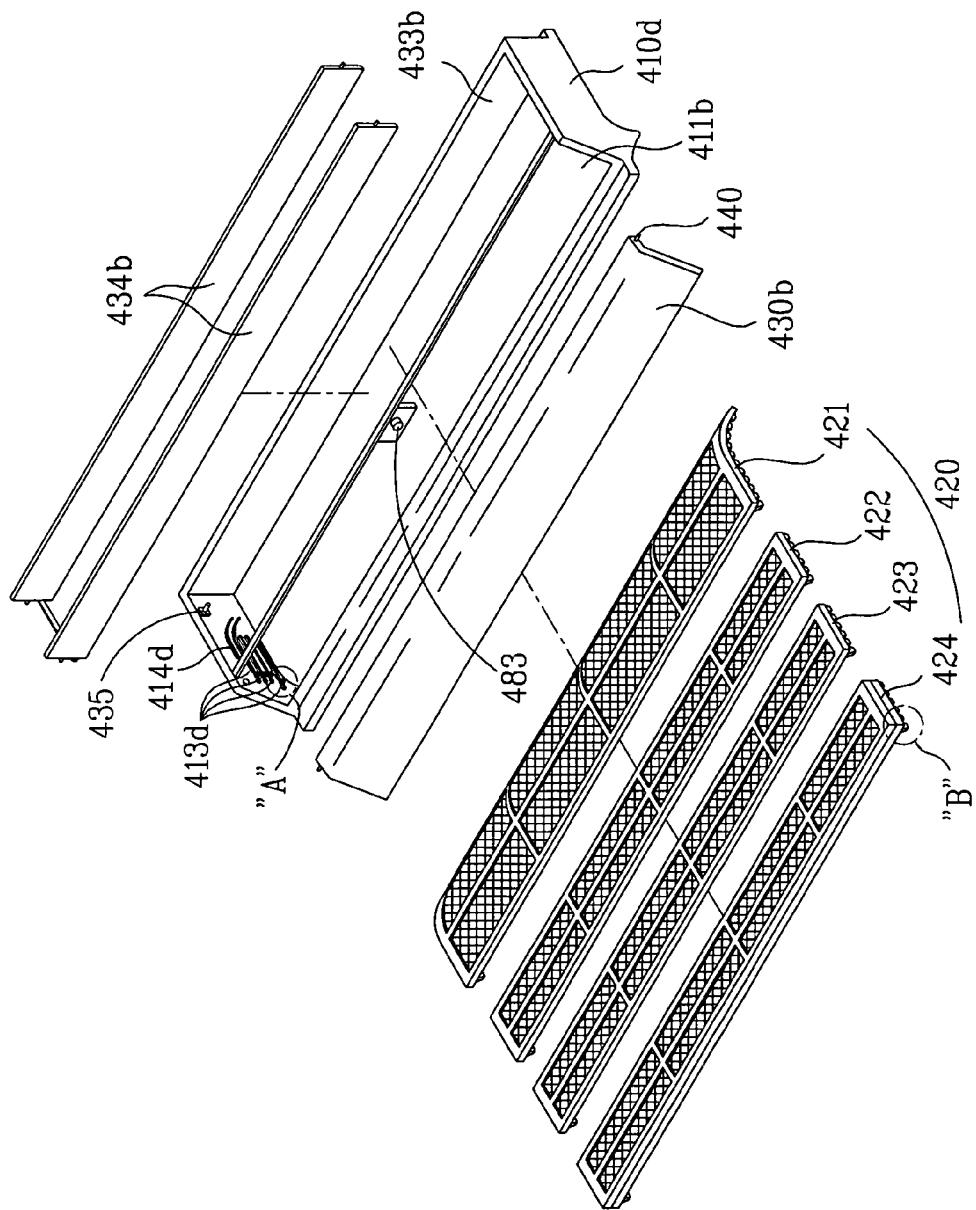
FIG. 18 illustrates a schematic perspective view showing a filter unit in accordance with a fifth embodiment of the present invention.
Figure 19:
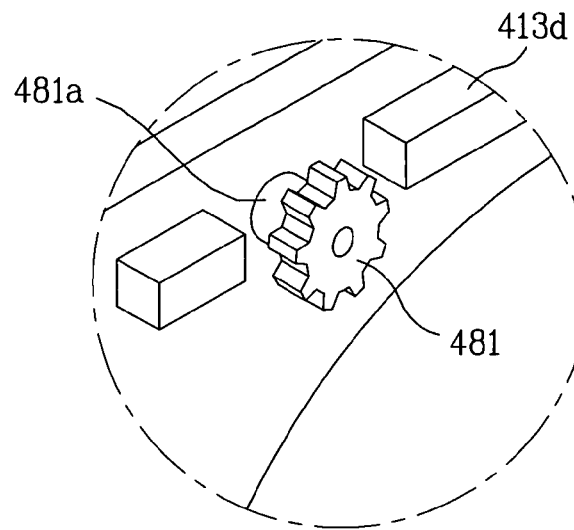
FIG. 19 illustrates an exploded perspective view showing "A" section of FIG. 18.
Figure 20:
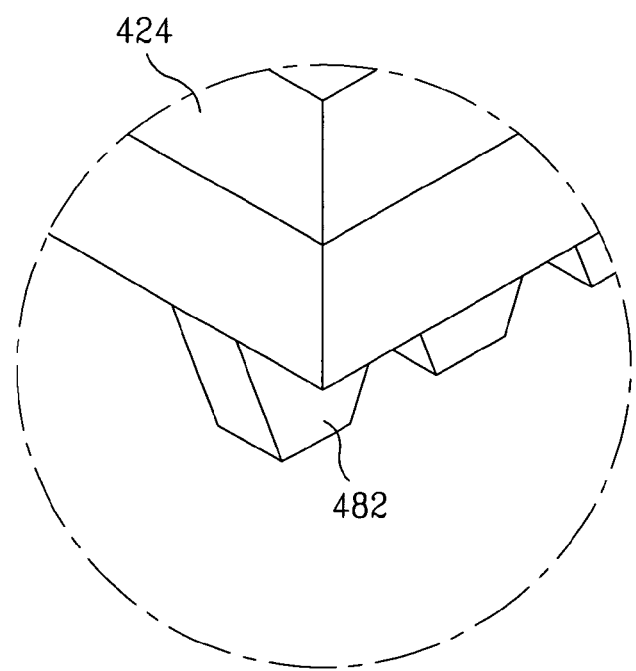
FIG. 20 illustrates an exploded perspective view showing "B" section of FIG. 18.
Figure 21:
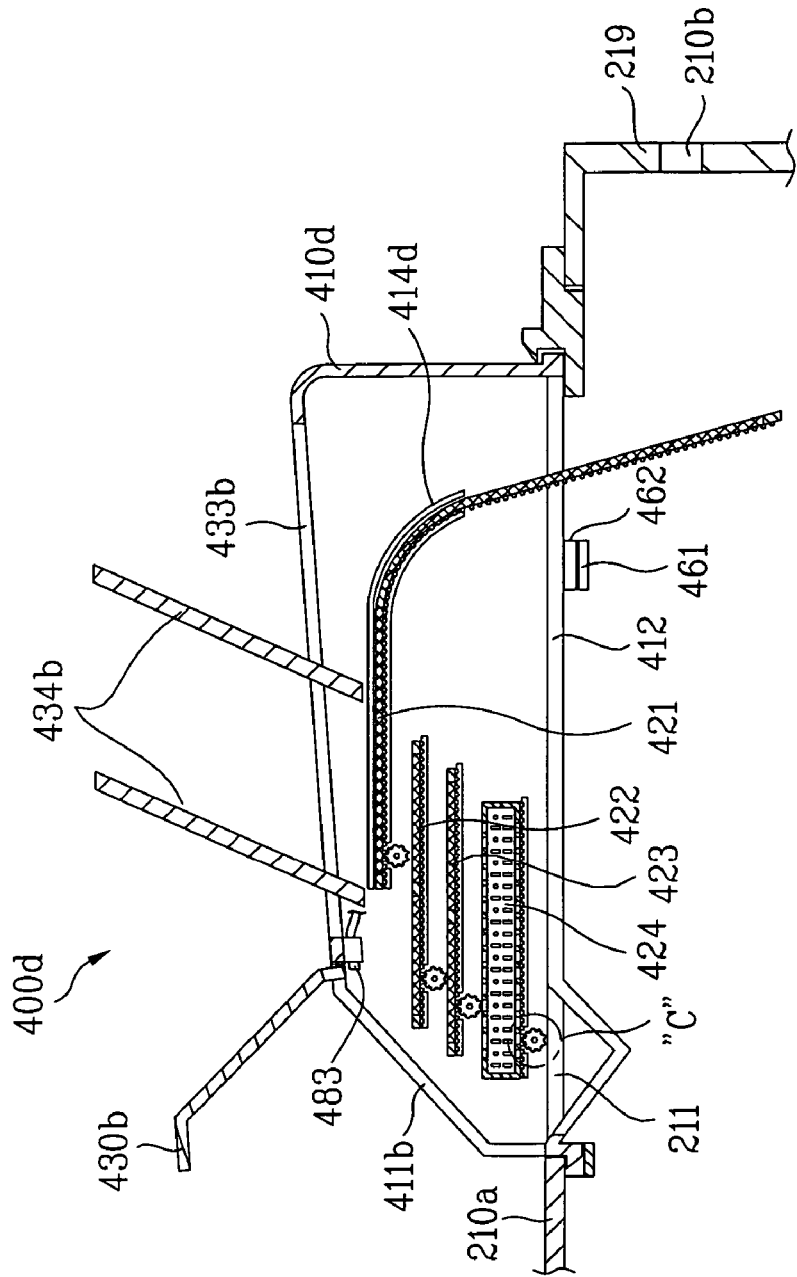
FIG. 21 illustrates a cross sectional view showing a state that a filter unit is provided in the indoor unit of the air conditioner in accordance with the fifth embodiment of the present invention.
Figure 22:
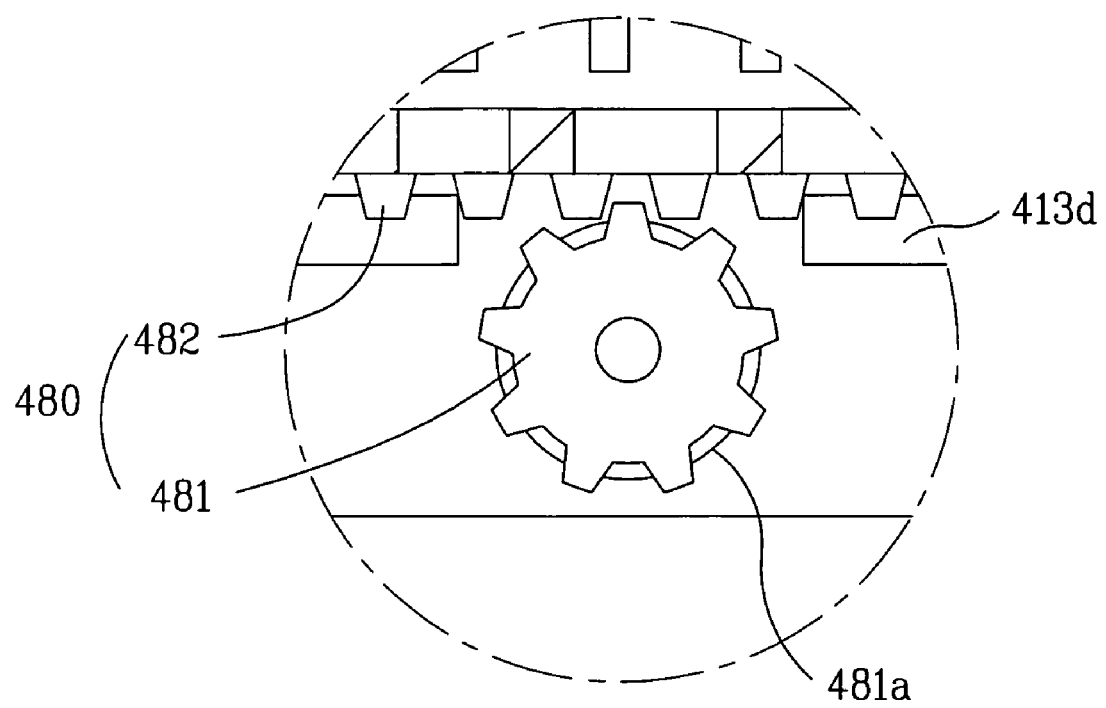
FIG. 22 illustrates an exploded perspective view showing "C" section of FIG. 21.
Figure 23:
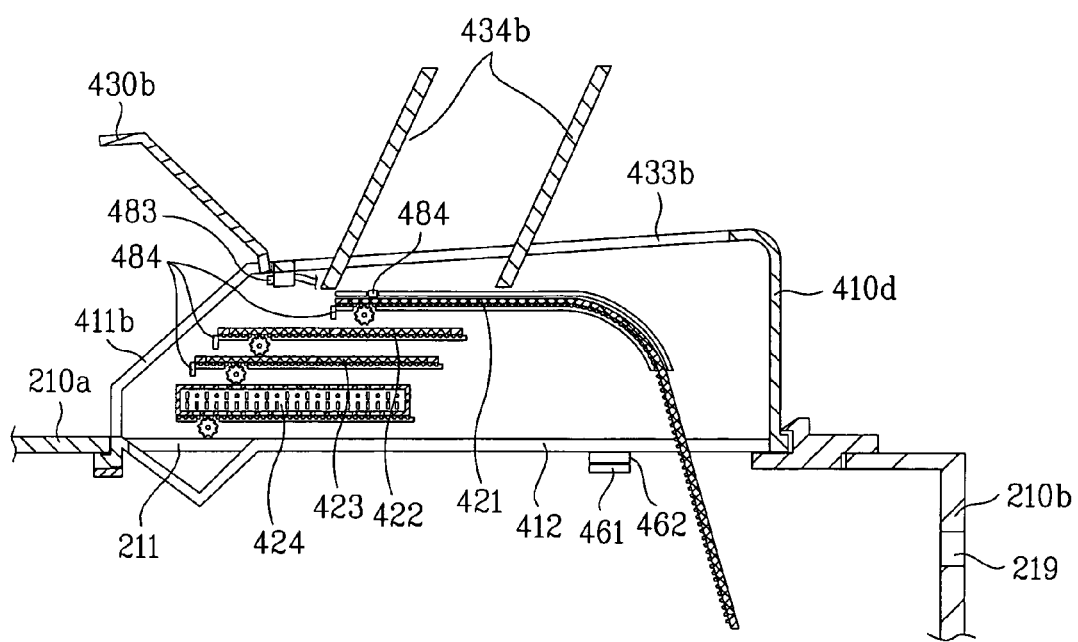
FIG. 23 illustrates a cross sectional view showing a fifth embodiment of a filter unit in accordance with the present invention, with a sensor for sensing contamination of the filter.

FIG. 18 illustrates a schematic perspective view showing a filter unit in accordance with a fifth embodiment of the present invention. FIG. 19 illustrates an exploded perspective view showing "A" section of FIG. 18. FIG. 20 illustrates an exploded perspective view showing "B" section of FIG. 18. FIG. 21 illustrates a cross sectional view showing a state that a filter unit is provided in the indoor unit of the air conditioner in accordance with the fifth embodiment of the present invention. FIG. 22 illustrates an exploded perspective view showing "C" section of FIG. 21. FIG. 23 illustrates a cross sectional view showing a fifth embodiment of a filter unit in accordance with the present invention, with a sensor for sensing contamination of the filter.

In describing the fifth embodiment of the filter unit in accordance with the present invention, since other structural elements except the filter drawer for withdrawing the filter are the same as the fourth embodiment of the filter unit aforementioned, the same numbers are used for the same elements, and the description of which will be omitted.

The filter drawer provided in the fifth embodiment of the filter unit in accordance with the present invention will be described hereunder.

The filter drawer withdraws the filters 421, 422, 423, and 424 to a front side of the filter case 410d via the operation of at least one motor 481a for withdrawing the filter. For this, it is desirable that the filter drawer includes a plurality of movement converters 480 provided to each of the filters 421, 422, 423, and 424.

Examples of the movement converter 480 of the filter drawer provided to withdraw the electric dust collector 424 located at a lower part of the filters 421, 422, 423, and 424 will be described hereunder.

The movement converter 480 of the filter drawer for withdrawing the electric dust collector 424 includes at least one pinion 481 which is rotated by the motor 481a for withdrawing the filter, and at least one rack 482 meshed with the pinion 481.

In other words, the rack 482 is configured to move straight in the direction of placing/withdrawing the electric dust collector 424 via the pinion 481.

In more detail, the rack 481 is provided at both ends of the electric dust collector 424, and the pinion 481 meshed with the rack 482 is provided on both inner walls of the filter case 410d. the pinion 481 being connected to a pivot of the motor 481a for withdrawing the filter.

In the present embodiment, the rack 482 and the electric dust collector 424 are formed as a single body. In this case, the rack 482 is provided under the both ends of the electric dust collector 424 so as to place/withdraw the electric dust collector 424 according to a rotation direction of the pinion 481.

The pinion 481 is provided in front of the placement/withdrawal guide for placing/withdrawing the electric dust collector 424, i.e., the rib 413d for guiding the placement/withdrawal of the electric dust collector 424.

In more detail, the pinion 481 passes through the rib 413d in an up/down direction so as to divide the pinion into a front portion and a rear portion, and the pivot thereof is vertically provided on a side wall in the filter case 410d.

The pinion 481 of course may be provided only on one of the both inner walls of the filter case, and the rack 482 corresponding to the pinion may also be provided only on one of the both ends of the electric dust collector 424.

The rack 482 and the electric dust collector 424 may not be formed as a single body, but provided separately. In other words, the electric dust collector 424 may be stably provided at an upper part of the rack 482 and go into or out of the filter case 410a through the rotation of the pinion 481.

Meanwhile, the motor 481a for withdrawing the filter includes a two-direction motor so as to automatically put/take in/out the electric dust collector 424.

The motor 481a for withdrawing the filter may include a one-direction rotation motor which rotates only in a direction of withdrawing the electric dust collector 424. In this instance, the installation of the filters 421, 422, 423, and 424 including the electric dust collector is manually carried out.

The filter drawer further includes at least one operating button 483 provided at the filter case 411d and operating the motor 481a for withdrawing the filter. In other words, the filters 421, 422, 423, and 424 may be configured to be withdrawn by one touch system.

The operating button 483 is provided at an upper part of the edge of the filter gate 411b. electrically connected to the motor 481a for withdrawing the filter, and exposed to the front side thereof when the cover 430b is opened. Accordingly, when the user opens the cover 430b and presses the operating button 493, the filters 421, 422, 423, and 424 are withdrawn to the front thereof.

The operating button 483 may be provided at the cabinet 210 of the indoor unit, particularly at the operation controller 214 of the cabinet. In this case, each of the filters 421, 422, 423, and 424 is withdrawn by one operating button 483.

Additionally, one operating button 483 may be provided respectively to each of the filters 421, 422, 423, and 424 so as to withdraw one of the filters 421, 422, 423, and 424. In the present invention, the operating button 483 is, but not limited to, a push button provided to be pressed.

The process of withdrawing the filters 421, 422, 423, and 424 from the filter unit is described hereunder. First of all, the user opens the cover 430b and presses the operating button 483.

As the operating button 483 is pressed, power source is supplied to the motor 481a for withdrawing the filter, and the pinion 481 is rotated by the operation of the motor 481a for withdrawing the filter.

Accordingly, moving toward the front side of the cabinet 410c. the rack 482 withdraws the filter provided at the upper part of the rack 482 to the front side of the filter case 410d.

In this case, when one operating button 483 is provided at the filter unit 400d, all the filters 421, 422, 423, and 424 of the filter unit are withdrawn as the operating button is pressed. When a separate operating button is provided at each filter, only a necessary filter is withdrawn.

In the mean time, in addition to the above structural elements, the filter unit 400d in accordance with the present invention further includes a plurality of sensors 484 for sensing a pollution level of the filters.

Referring to FIG. 23, the sensors 484 are provided, corresponding to each of the filters, at the filter case 410d, particularly to the rib 413d of the filter case 410d, so as to sense the amount of dust stacked on the surface of the filters 421, 422, 423, and 424.

The sensors 484 may be provided on each surface of the filters 421, 422, 423, and 424. The pollution level of the filter, sensed by each sensor 484, may be displayed on a display member 215*a* of the indoor unit, or may also be displayed on the other display member (not shown) separately provided at the filter unit.

When the pollution level of each of the filters 421, 422, 423, and 424, the user determines a replacement time and a cleaning time according to the pollution level of the filter, and the filter needed to be cleaned is withdrawn to outside thereof through the filter drawer.

When the pollution level of the filter is over a predetermined level, the pollution level sensed by the sensor 484, the filter needed to be cleaned or replaced, after a predetermined time or right away, may be automatically withdrawn by operation of the withdrawing device.

In other words, when the pollution level of the filter is over the predetermined level and the polluted filter needs to be cleaned or replaced, a power source is automatically supplied to the motor 481*a* for withdrawing the filter via a controller such that the filter drawer begins to work.

Figure 24:
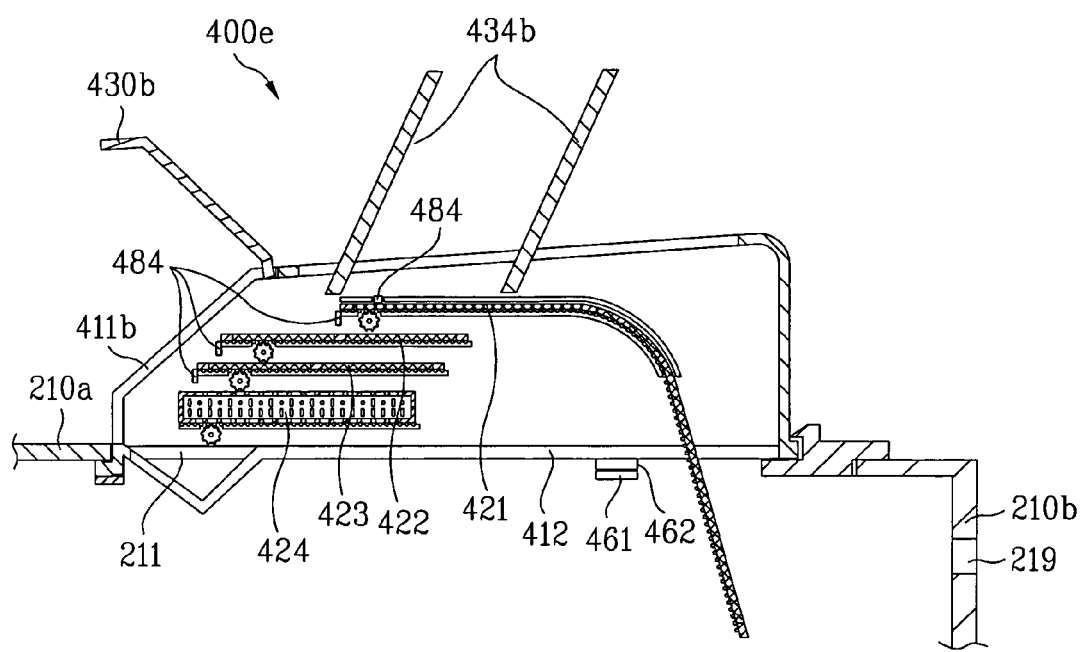
FIG. 24 illustrates a cross sectional view showing a sixth embodiment of the filter unit in accordance with the present invention, being mounted at the indoor unit of the air conditioner.

A sixth embodiment of the filter unit 400*e* in accordance with the present invention is illustrated in FIG. 24, which is structured to automatically withdraw a filter needed to be cleaned or replaced when the pollution level of the filter is over the predetermined level. In above case, the cover 430*b* for opening/closing the filter gate is automatically opened through the controller when the filters are withdrawn.

The effect of the filter unit for the air conditioner in accordance with the present invention including the above structural elements will be summarized as follows.

First, since the filter unit in accordance with the present invention is provided at an indoor unit of the air conditioner so as to purify the air drawn into the indoor unit, purification efficiency is improved.

Second, according to the filter unit in accordance with the present invention, a cover for opening/closing a filter gate is provided at the filter case. Therefore, the filter provided in the filter case is protected and impurities are prevented from being entered into the filter case.

Third, according to the filter unit in accordance with the present invention, an air inlet and a louver for opening/closing the air inlet are provided at the cover. Therefore, the structure is simple, it is easy to manufacture, and the impurities are prevented from being entered when the air conditioner stops working.

Fourth, according to the filter unit in accordance with the present invention, a filter drawer for withdrawing the filter is provided. Therefore, it is easy to place/withdraw the filter for replacement or cleaning.

Fifth, according to the filter unit in accordance with the present invention, since the filter is withdrawn in one-touch system, it is easier to withdraw the filter.

Sixth, according to the filter unit in accordance with the present invention, since a sensor for sensing a pollution level of the filter is provided, the filter is cleaned or replaced at a proper time, thereby preventing the air purifying efficiency from being lowered.

Seventh, according to the filter unit in accordance with the present invention, since information related to the pollution level of the filter is displayed outside, a time for cleaning or replacing the filter is properly determined.

Eighth, according to the filter unit in accordance with the present invention, since an electric dust collector, a heap filter, a nano carbon filter, a nano copper filter, and a nano silver filter are provided at the filter member of the filter unit, efficiency of purifying the room air is improved.

Ninth, according to the filter unit in accordance with the present invention, since a placement/withdrawal guide for guiding the filter is provided in the filter case, the filter is simply placed or withdrawn to/from the filter case in a sliding system, thus stably provided in the filter case.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An indoor unit of an air conditioner, the indoor unit comprising:
    a cabinet forming an exterior of the indoor unit, the cabinet having an air inlet in an outside surface thereof;
    a fan mounted in the cabinet;
    an indoor heat exchanger mounted in the cabinet; and
    a filter unit detachably mounted on the outside surface of the cabinet over the air inlet such that air in drawn in through the filter unit and flows into the cabinet through the air inlet, wherein the filter unit comprises:
        a filter for purifying air;
        a filter case accommodating the filter therein and having a filter gate at a side thereof for placing/withdrawing the filter thereto/therefrom, the filter being detachably mounted on the outside surface of the cabinet; and
        a cover mounted to the filter case for opening/closing the filter gate, the cover being exposed to form an exterior of the indoor units,
    wherein the filter case is exposed to outside of the cabinet forming an exterior of the cabinet.

2. The indoor unit of claim 1, wherein the cover is rotatably connected to a side of an edge of the filter gate.

3. The indoor unit of claim 1, wherein the cover comprises:
    a first panel having a side rotatably connected to an edge of the filter gate; and
    a second panel having a side rotatably connected to the edge of the filter gate.

4. The indoor unit of claim 3, wherein the first panel is rotatably connected to one of the both ends of the edge of the filter gate, and the second panel is rotatably connected to another one of the both ends of the edge of the filter gate.

5. The indoor unit of claim 1, wherein the filter gate is provided at an upper part of the filter case.

6. The indoor unit of claim 1, wherein the cover comprises an air inlet for drawing in the air into the filter case.

7. The indoor unit of claim 6, wherein the cover further comprises a louver for opening/closing the air inlet.

8. The indoor unit of claim 7, wherein the louver guides the air drawn in through the air inlet.

9. The indoor unit of claim 1, wherein the filter case comprises a placement/withdrawal guide for guiding the filter.

10. The indoor unit of claim 1, further comprising a filter drawer for withdrawing the filter.

11. The indoor unit of claim 10, wherein the filter drawer comprises:
    an elastic means provided at one of the filter and the filter case and applying restoring force to the filter in a direction of withdrawing the filter; and
    a restoration controller for controlling the restoration of the elastic means.

12. The indoor unit of claim 11, wherein the elastic means comprises a side connected to the filter case.

13. The indoor unit of claim 11, wherein the restoration controller comprises:
    a fixing means for fixing the elastic means in a changed shape; and a releaser for releasing the elastic means fixed by the fixing means.

14. The indoor unit of claim 13, wherein the fixing means comprises a hook member provided at the filter case and binding one of the filter and the elastic means.

15. The indoor unit of claim 14, wherein the hook member is rotatably provided at the filter case.

16. The indoor unit of claim 13, wherein the releaser comprises:
a withdrawal button provided at the filter case; and
a link member having a first end connected to the withdrawal button and a second end connected to the fixing means.

17. The indoor unit of claim 10, wherein the filter drawer comprises a movement converter for converting a rotation movement of a motor into a straight movement in a direction of placing/withdrawing the filter so as to withdraw the filter.

18. The indoor unit of claim 17, wherein the movement converter comprises:
a pinion being rotated by the motor for withdrawing the filter; and
a rack moving straight in the direction of withdrawing the filter by the pinion so as to withdraw the filter.

19. The indoor unit of claim 18, wherein the rack and the filter unit are formed as a single body.

20. The indoor unit of claim 10, wherein the filter drawer comprises a filter handle provided at a side of the filter.

21. The indoor unit of claim 10, wherein the filter is withdrawn outside of the filter case by one-touch system.

22. The indoor unit of claim 1, further comprising a sensor for sensing a pollution level of the filter.

23. The indoor unit of claim 22, wherein the filter is automatically withdrawn from the filter case when the pollution level of the filter is over a predetermined level, the pollution level sensed by the sensor.

24. The indoor unit of claim 22, wherein information related to the pollution of the filter is displayed outside thereof.

25. The indoor unit of claim 1, wherein the filter case is detachably provided on an outer wall of the indoor unit of the air conditioner and communicating with the indoor unit.

26. An indoor unit of an air conditioner, the indoor unit comprising:
a cabinet forming an exterior of the indoor unit, the cabinet having an air inlet in an outside surface thereof;
a fan mounted in the cabinet;
an indoor heat exchanger mounted in the cabinet; and
a filter unit detachably mounted on the outside surface of the cabinet over the air inlet such that air in drawn in through the filter unit and flows into the cabinet through the air inlet, wherein the filter unit comprises:
a filter case detachably mounted on an upper part of the inlet provided on the outside surface of the cabinet;
a filter arranged at the air inlet and accommodated in the filter case for purifying air;
a filter gate provided at an upper side of the filter case to withdraw the filter from the filter case or place the filter into the filter case; and
a cover opening and closing the filter gate, the cover being rotatably connected to a side of the filter gate,
wherein the filter case is exposed to outside of the cabinet forming an exterior of the cabinet.

27. The indoor unit of claim 26, further comprising a louver rotatable for opening and closing the air inlet and guiding air drawn through the air inlet.

28. The indoor unit of claim 26, wherein the filter case comprises a placement/withdrawal guide of guiding the filter.

29. The indoor unit of claim 26, further comprising a filter drawer for withdrawing the filter.

30. An indoor unit of an air conditioner, the indoor unit comprising:
a cabinet forming an exterior of the indoor unit; and
a filter unit detachably mounted to an outside surface of the cabinet, wherein the filter unit comprises:
at least one air inlet;
a filter for purifying air drawn in through the at least one air inlet; and
at least one louver mounted in the at least one inlet, wherein the at least one louver is exposed to form an exterior of the indoor unit,
wherein the filter unit is exposed to outside of the cabinet forming an exterior of the cabinet.

* * * * *